United States Patent
Fu et al.

(10) Patent No.: US 12,431,660 B2
(45) Date of Patent: Sep. 30, 2025

(54) POWER ADAPTERS

(71) Applicant: GUANGDONG OPPO MOBILE TELECOMMUNICATIONS CORP., LTD., Guangdong (CN)

(72) Inventors: Yong Fu, Guangdong (CN); Bin Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 385 days.

(21) Appl. No.: 18/191,673

(22) Filed: Mar. 28, 2023

(65) Prior Publication Data

US 2023/0231336 A1    Jul. 20, 2023

Related U.S. Application Data

(63) Continuation of application No. PCT/CN2021/115660, filed on Aug. 31, 2021.

(30) Foreign Application Priority Data

Oct. 30, 2020   (CN) .......................... 202011196342.7
Oct. 30, 2020   (CN) .......................... 202022481686.4

(51) Int. Cl.
   *H01R 13/453*   (2006.01)
   *H01R 24/28*    (2011.01)

(52) U.S. Cl.
   CPC ......... *H01R 13/4538* (2013.01); *H01R 24/28* (2013.01)

(58) Field of Classification Search
   CPC .. H01R 13/4538; H01R 24/28; H01R 13/447; H01R 13/44; H01R 13/40; H01R 13/701

(Continued)

(56) References Cited

U.S. PATENT DOCUMENTS

| 5,030,119 | A | 7/1991 | Lowe |
| 6,167,291 | A | 12/2000 | Barajas et al. |
| 2016/0197561 | A1 | 7/2016 | Riphin |

FOREIGN PATENT DOCUMENTS

| CN | 201490447 U | 5/2010 |
| CN | 207977900 U | 10/2018 |

(Continued)

OTHER PUBLICATIONS

First Chinese Office Action with English translation, issued in corresponding CN Application No. 202011196342.7, dated Nov. 30, 2024, 23 pages.

(Continued)

*Primary Examiner* — Christopher M Koehler
*Assistant Examiner* — Jeffrey Mountain
(74) *Attorney, Agent, or Firm* — Young Basile Hanlon & MacFarlane, P.C.

(57) ABSTRACT

A power adapter and an electronic device assembly including the power adapter are provided. The power adapter includes an adapter body, prongs, and a cover. The adapter body has a first end surface. The prongs are exposed at the first end surface of the adapter body. The cover is movably connected with the adapter body, and the cover has a second end surface. When the cover is in a closed state, the prongs are covered, and the second end surface is away from the adapter body. When the cover is in an open state, the first end surface and the second end surface cooperatively form a plugging surface of the power adapter.

16 Claims, 10 Drawing Sheets

(58) Field of Classification Search
USPC .......................................................... 439/135
See application file for complete search history.

(56) References Cited

FOREIGN PATENT DOCUMENTS

| | | | |
|---|---|---|---|
| CN | 210092493 | U | 2/2020 |
| CN | 210517843 | U | 5/2020 |
| CN | 210517852 | U | 5/2020 |
| CN | 210692899 | U | 6/2020 |
| CN | 210806233 | U | 6/2020 |
| CN | 210853314 | U | 6/2020 |
| CN | 211063364 | U | 7/2020 |
| CN | 211428458 | U | 9/2020 |
| CN | 112886311 | A | 6/2021 |
| CN | 214204063 | U | 9/2021 |
| CN | 113571947 | A | 10/2021 |
| CN | 214479684 | U | 10/2021 |
| CN | 216531096 | * | 5/2022 |
| GB | 2546695 | A | 7/2017 |

OTHER PUBLICATIONS

Extended European Search Report issued in corresponding EP application No. 21884664.0, dated Feb. 15, 2024, 11 pages.
International Search Report and Written Opinion with English Translation for PCT Application PCT/CN2021/115660 mailed Nov. 26, 2021. (22 pages).

* cited by examiner

POWER ADAPTERS

CROSS-REFERENCE TO RELATED APPLICATION(S)

This application is a continuation of International Application No. PCT/CN2021/115660, filed Aug. 31, 2021, which claims priority to Chinese Patent Application No. 202011196342.7, filed Oct. 30, 2020, and Chinese Patent Application No. 202022481686.4, filed Oct. 30, 2020, the entire disclosures of all of which are hereby incorporated by reference.

TECHNICAL FIELD

This disclosure relates to the field of electronic technology, and particularly to power adapters.

BACKGROUND

With progress in technology, electronic devices such as mobile phones have become indispensable products in users' life. A power adapter is usually used for charging the electronic device such as the mobile phone.

An existing power adapter usually includes an adapter body and prongs exposed out of the adapter body. However, the prongs of the existing power adapter are completely exposed and therefore are prone to damage.

SUMMARY

The disclosure provides a power adapter. The power adapter includes an adapter body, prongs, and a cover. The adapter body has a first end surface. The prongs are exposed at the first end surface of the adapter body. The cover is connected with and slidable relative to the adapter body, and the cover has a second end surface. When the cover is in a closed state, the prongs are covered, and the second end surface is away from the adapter body. When the cover is in an open state, the first end surface and the second end surface cooperatively form a plugging surface of the power adapter.

The disclosure further provides a power adapter. The power adapter includes an adapter body, prongs, a first cover, and a second cover. The adapter body has a first end surface where the prongs are exposed. The first cover and the second cover each are slidably connected with the adapter body. The first cover has a first end subsurface, and the second cover has a second end subsurface. At least one of the first cover or the second cover has an accommodating cavity, and when the first cover and the second cover are both in a closed state, the prongs are accommodated in the accommodating cavity, and the first end subsurface and the second end subsurface are both away from the first end surface. When the first cover and the second cover are both in an open state, the first cover is disposed at one of two opposite sides of the adapter body and the second cover is disposed at the other one of the two opposite sides of the adapter body to expose the prongs, and the first end surface, the first end subsurface, and the second end subsurface cooperatively form a plugging surface of the power adapter.

BRIEF DESCRIPTION OF DRAWINGS

In order for clarity in elaboration of technical solutions of implementations of the disclosure, the following will give a brief introduction to the accompanying drawings used for describing the implementations. Apparently, the accompanying drawings described below are some implementations of the disclosure. Based on these drawings, those of ordinary skill in the art can also obtain other drawings without creative effort.

DETAILED DESCRIPTION

Figure 1:
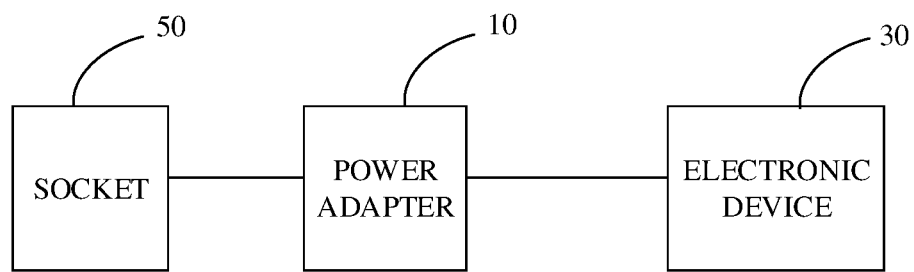
FIG. 1 is a schematic diagram illustrating an application scenario of a power adapter provided in an implementation of the disclosure.

In a first aspect of implementations of the disclosure, a power adapter is provided. The power adapter includes an adapter body, prongs, and a cover. The adapter body has a first end surface. The prongs are exposed at the first end surface of the adapter body. The cover is movably connected the adapter body, and the cover has a second end surface. When the cover is in a closed state, the prongs are covered, and the second end surface is away from the adapter body. When the cover is in an open state, the first end surface and the second end surface cooperatively form a plugging surface of the power adapter.

The cover includes a first cover and a second cover. The first cover is connected with and slidable relative to the adapter body and has a first end subsurface. The second cover is connected with and slidable relative to the adapter body and has a second end subsurface. The second end surface includes the first end subsurface and the second end subsurface. When the first cover and the second cover are in the closed state, the first end subsurface and the second end subsurface are away from the adapter body. When the first cover and the second cover are both in the open state, the first end subsurface is disposed at one of two opposite sides of the first end surface, the second end subsurface is disposed at the other one of the two opposite sides of the first end surface, and the first end subsurface, the second end subsurface, and the first end surface cooperatively form the plugging surface of the power adapter.

The power adapter further includes a first sliding assembly and a second sliding assembly. The first sliding assembly has one end rotatably connected with the first cover and the other end rotatably connected with the adapter body, such that the first cover is slidable relative to the adapter body. The second sliding assembly has one end rotatably connected with the second cover and the other end rotatably connected with the adapter body, such that the second cover is slidable relative to the adapter body.

The first sliding assembly includes a first connecting member. The first connecting member has a first rotating portion, a first connecting portion, and a second rotating portion that are sequentially connected, where the first rotating portion is rotatably connected with the first cover, and the second rotating portion is rotatably connected with the adapter body.

The adapter body further has a first surface and a second surface, where the first surface and the second surface are each connected with the first end surface and are disposed opposite to each other, the first surface is disposed close to the first cover, and the second surface is disposed close to the second cover. The first sliding assembly further includes a second connecting member. The second connecting member has a third rotating portion, a second connecting portion, and a fourth rotating portion that are sequentially connected, where the third rotating portion is rotatably connected with the first cover, the fourth rotating portion is rotatably connected with the adapter body, and a connecting point between the second rotating portion and the adapter body and a connecting point between the fourth rotating portion and the adapter body are both away from the first surface.

A point at which the first rotating portion is rotatably connected with the first cover is a first connecting point, the connecting point between the second rotating portion and the adapter body is a second connecting point, and a point at which the third rotating portion is rotatably connected with the first cover is a third connecting point. When the first cover is in the closed state, the third connecting point is farther away from the first end surface than the first connecting point. The connecting point between the fourth rotating portion and the adapter body is a fourth connecting point, the fourth connecting point is closer to the first end surface than the second connecting point, and a line between the first connecting point and the third connecting point is parallel to a line between the second connecting point and the fourth connecting point.

A distance between the first connecting point and the second connecting point is equal to a distance between the third connecting point and the fourth connecting point.

The third rotating portion, the second connecting portion, and the fourth rotating portion are sequentially connected in a bent manner, to define an avoidance space that faces the first connecting member, where the avoidance space is used for avoiding interference between the first connecting member and the second connecting member during rotation of the first connecting member and the second connecting member. When the first cover is in the closed state, the first connecting portion abuts against the fourth rotating portion. When the first cover is in the open state, the first rotating portion abuts against the third rotating portion.

The first end surface defines an opening. When the first cover is in the open state, a surface of the fourth rotating portion away from the first connecting member is exposed at the opening and does not exceed the first end surface.

The first sliding assembly is implemented as two first sliding assemblies, and the two first sliding assemblies are spaced apart from each other. When the first cover is in the closed state, the prongs are between the two first sliding assemblies.

The second sliding assembly is implemented as two sliding assemblies, and the two second sliding assemblies are spaced apart from each other. When the second cover is in the closed state, the prongs are disposed between the two second sliding assemblies, and for the first sliding assembly and the second sliding assembly that are at the same side of the prong, the second sliding assembly is farther away from the prong than the first sliding assembly.

The second cover has a third surface and a fourth surface, where the third surface and the fourth surface are each connected with the second end subsurface. The third surface constitutes a part of an appearance surface of the power adapter. The fourth surface is disposed opposite to the third surface, and the fourth surface defines a limiting portion for preventing shaking of the second sliding assembly.

The fourth surface further defines a first accommodating portion and a second accommodating portion. When the first cover and the second cover are in the closed state, the first accommodating portion accommodates at least a part of the first connecting member and at least a part of the second connecting member, and the second accommodating portion accommodates the prong.

The power adapter further includes a first magnetic member and a second magnetic member. The first magnetic member is carried on the first cover. The second magnetic member is carried on the second cover. When the first cover and the second cover are both in the closed state, a magnetic force between the first magnetic member and the second magnetic member makes the first cover and the second cover be fixed at the same side of the first end surface. When the first cover and the second cover are both in the open state, the magnetic force between the first magnetic member and the second magnetic member makes the first cover and the second cover each be fixed on the adapter body.

When the cover is in the open state, a distance between an edge of the prong close to the cover and an edge of the cover away from the prong is larger than or equal to 6.5 millimeters (mm), or larger than or equal to 5.1 mm, or larger than or equal to 7.9 mm.

The cover includes a first cover and a second cover connected with the adapter body. When the first cover and the second cover are both in the open state, the first cover is disposed at one of two opposite sides of the adapter body, and the second cover is disposed at the other one of the two opposite sides of the adapter body. A thickness D1 of the adapter body fulfills 6.3 mm≤D1≤14 mm, a thickness D2 of the first cover fulfills 4.825 mm≤D2≤7 mm, and a thickness D3 of the second cover fulfills 4.825 mm≤D3≤7 mm.

In a second aspect, a power adapter is further provided in implementations of the disclosure. The power adapter includes an adapter body, prongs, a first cover, and a second cover. The adapter body has a first end surface where the prongs are exposed. The first cover and the second cover each are slidably connected with the adapter body. The first cover has a first end subsurface, and the second cover has a second end subsurface. At least one of the first cover or the second cover has an accommodating cavity, and when the first cover and the second cover are both in a closed state, the prongs are accommodated in the accommodating cavity, and the first end subsurface and the second end subsurface are both away from the first end surface. When the first cover and the second cover are both in an open state, the first cover is disposed at one of two opposite sides of the adapter body and the second cover is disposed at the other one of the two opposite sides of the adapter body to expose the prongs, and the first end surface, the first end subsurface, and the second end subsurface cooperatively form a plugging surface of the power adapter.

The adapter body has a first surface and a second surface that are disposed opposite to each other, where the first surface and the second surface are each connected with the first end surface. The second cover is closer to the second surface than the first cover. The second cover has a third surface and a fourth surface that are disposed opposite to each other, and the third surface and the fourth surface are each connected with the second end subsurface. When the second cover is in the closed state, the third surface constitutes a part of an appearance surface of the power adapter. When the second cover is in the open state, the third surface is farther away from the second surface than the fourth surface.

The first cover has a fifth surface and a sixth surface that are disposed opposite to each other, and the fifth surface and the sixth surface are each connected with the first end subsurface. When the first cover is in the closed state, the fifth surface constitutes a part of the appearance surface of the power adapter. When the first cover is in the open state, the fifth surface is farther away from the first surface than the sixth surface.

The power adapter further includes a first sliding assembly and a second sliding assembly. The first sliding assembly has one end rotatably connected with the first cover and the other end rotatably connected with the adapter body, and a connecting point at which the first sliding assembly is connected with the adapter body is close to the second surface. The second sliding assembly has one end rotatably connected with the second cover and the other end rotatably connected with the adapter body, and a connecting point at which the second sliding assembly is connected with the adapter body is close to the first surface.

The power adapter further includes a first magnetic member and a second magnetic member. The first magnetic member is carried on the first cover. The second magnetic member is carried on the second cover. When the first cover and the second cover are both in the closed state, a magnetic force between the first magnetic member and the second magnetic member makes the first cover and the second cover be fixed at the same side of the first end surface. When the first cover and the second cover are both in the open state, the magnetic force between the first magnetic member and the second magnetic member makes the first cover and the second cover each be fixed on the adapter body.

When the first cover and the second cover are both in the open state, a distance between an edge of the prong close to the first cover and an edge of the first cover away from the prong is larger than or equal to 6.5 mm, and a distance between an edge of the prong close to the second cover and an edge of the second cover away from the prong is larger than or equal to 6.5 mm; or the distance between the edge of the prong close to the first cover and the edge of the first cover away from the prong is larger than or equal to 5.1 mm, and the distance between the edge of the prong close to the second cover and the edge of the second cover away from the prong is larger than or equal to 5.1 mm; or the distance between the edge of the prong close to the first cover and the edge of the first cover away from the prong is larger than or equal to 7.9 mm, and the distance between the edge of the prong close to the second cover and the edge of the second cover away from the prong is larger than or equal to 7.9 mm.

A thickness D1 of the adapter body fulfills 6.3 mm≤D1≤14 mm, a thickness D2 of the first cover fulfills 4.825 mm≤D2≤7 mm, and a thickness D3 of the second cover fulfills 4.825 mm≤D3≤7 mm.

In a third aspect, an electronic device assembly is further provided in implementations of disclosure. The electronic device assembly includes an electronic device and the power adapter as mentioned above. The power adapter is configured to charge the electronic device.

The following will describe technical solutions of implementations of the disclosure clearly and completely with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The "embodiment" or "implementation" referred to herein means that a particular feature, structure, or characteristic described in connection with the embodiment or implementation may be included in at least one embodiment of the disclosure. The phrase appearing in various places in the description does necessarily refer to the same embodiment, nor does it refer to independent or alternative embodiments that are mutually exclusive to other embodiments. It is explicitly and implicitly understood by those skilled in the art that the embodiments described herein may be combined with other embodiments.

The disclosure provides a power adapter 10. Referring to FIG. 1, FIG. 1 is a schematic diagram illustrating an application scenario of the power adapter provided in an implementation of the disclosure. The power adapter 10 is a conversion device for providing electrical energy for an electronic device 30. Generally, the power adapter 10 can convert an alternating-current (AC) voltage into a direct-current (DC) voltage. For example, the power adapter 10 is plugged into a socket 50 to receive an AC voltage outputted by the socket 50 and converts the received AC voltage into a DC voltage, and the DC voltage is to be applied to the electronic device 30, such as a mobile phone, a computer, etc., for charging. It can be understood that, in other implementations, the power adapter 10 converts a received AC voltage into a DC voltage, and the DC voltage is directly applied to electronic components in the electronic device 30. It can be understood that, the schematic diagram illustrating the application scenario of the power adapter 10 is merely intended for better understanding of application of the power adapter 10, and shall not be understood as limitation on the power adapter 10 provided in the disclosure.

Figure 2:
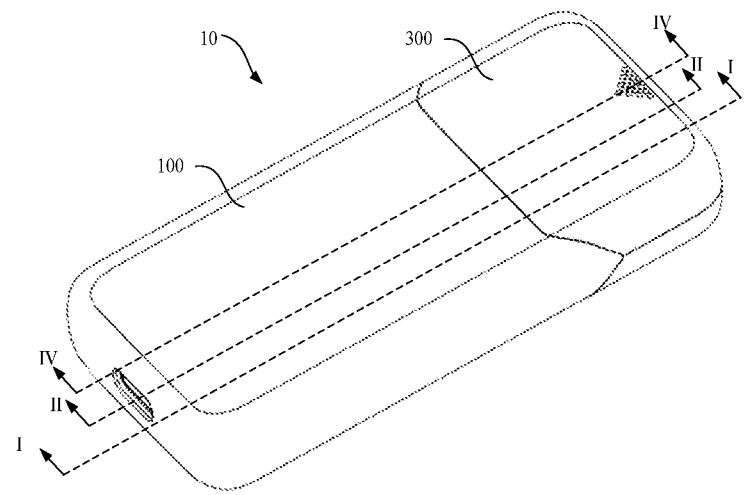
FIG. 2 is a schematic view of a power adapter provided in an implementation of the disclosure, a cover of the power adapter being in a closed state.
Figure 3:
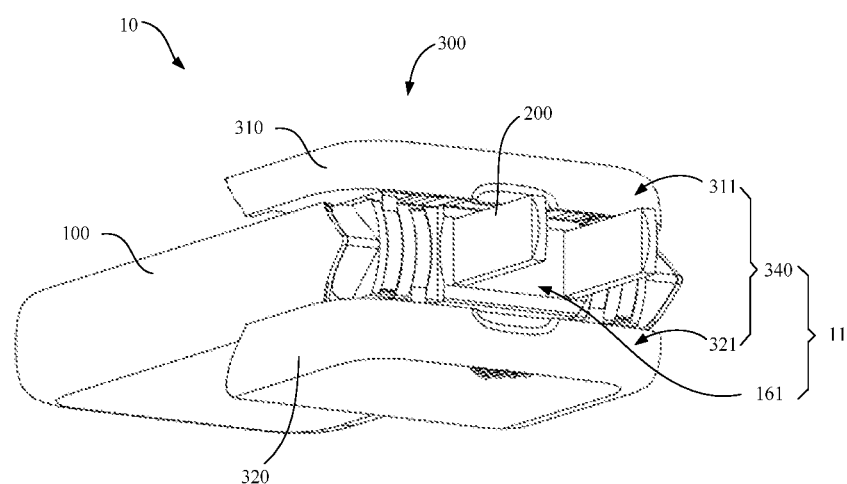
FIG. 3 is a schematic view of the power adapter illustrated in FIG. 2, the cover being in an open state.
Figure 4:
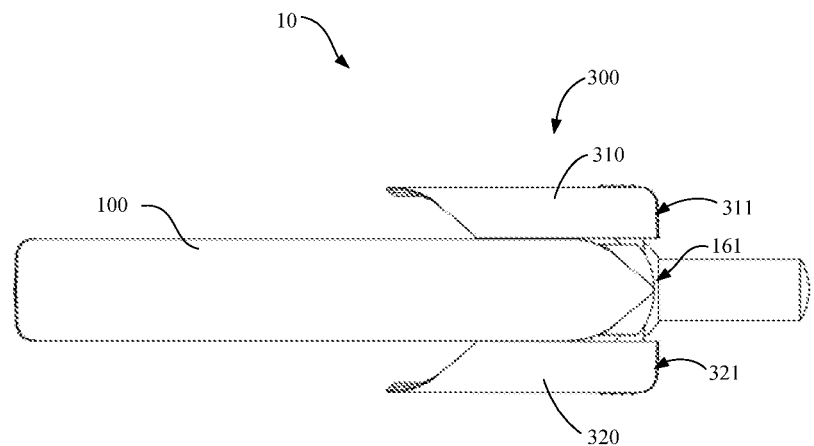
FIG. 4 is a schematic view of the power adapter in FIG. 3, viewed from another direction.

Referring to FIG. 2, FIG. 3, and FIG. 4, FIG. 2 is a schematic view of the power adapter provided in an implementation of the disclosure, where a cover of the power adapter is in a closed state; FIG. 3 is a schematic view of the power adapter illustrated in FIG. 2, where the cover is in an open state; and FIG. 4 is a schematic view of the power adapter in FIG. 3, viewed from another direction. The power adapter 10 includes an adapter body 100, prongs 200, and a cover 300. The adapter body 100 has a first end surface 161. The prongs 200 are exposed at the first end surface 161 of the adapter body 100. The cover 300 is movably connected with the adapter body 100 and has a second end surface 340. When the cover 300 is in a closed state, the prongs 200 are covered, and the second end surface 340 is away from the adapter body 100. When the cover 300 is in an open state, the first end surface 161 and the second end surface 340 cooperatively form a plugging surface 11 of the power adapter 10.

It is to be noted that, the terms "first", "second", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

The adapter body 100 refers to a part of the power adapter 10 that can implement a voltage-conversion function. The adapter body 100 usually includes a circuit board 120 (see FIG. 24) for voltage conversion. The adapter body 100 may further include a component for accommodating a casing, etc. of the circuit board. For the structure of the adapter body 100, detailed introduction will be given below in connection with an exploded view of the power adapter 10.

The prong 200 is made of metal. The prongs 200 are plugged into the socket 50 and configured to receive an AC voltage from the socket 50. The prongs 200 may be implemented as, but is not limited to, two prongs. In the implementations, the prongs 200 are implemented as two prongs. The two prongs 200 are opposite to and spaced part from each other. The prong 200 may be, but is not limited to, bar-shaped. The prong 200 has an arc-shaped end away from the adapter body 100, which is convenient for plugging the prong 200 into the socket 50. When the prongs 200 are plugged into the socket 50 to receive a first voltage, the circuit board 120 is electrically connected with the prongs 200 and receives the first voltage from the prongs 200, and the circuit board 120 is used for converting the first voltage into a second voltage.

"When the cover 300 is in the closed state, the prongs 200 are covered" includes but is not limited to the following cases: the prongs 200 are covered by the cover 300, or the prongs 200 are covered by the adapter body 100, or the prongs 200 are covered by the adapter body 100 and the cover 300 cooperatively. "The prongs 200 are covered by the cover 300" is exemplified as follows. The cover 300 defines an accommodating cavity, and when the cover 300 is closed, the prongs 200 are accommodated in the accommodating cavity of the cover 300, and thus the prongs 200 are covered. "The prongs 200 are covered by the adapter body 100" is exemplified as follows. The adapter body 100 defines an accommodating cavity, and when the cover 300 is closed, the prongs 200 retract into the accommodating cavity of the adapter body 100. In this case, the prongs 200 are covered by the adapter body 100. "The prongs 200 are covered by the adapter body 100 and the cover 300 cooperatively" is exemplified as follows. The adapter body 100 and the cover 300 cooperatively define an accommodating cavity, and when the cover 300 is closed, the prongs 200 are accommodated in the accommodating cavity defined by the adapter body 100 and the cover 300 cooperatively.

Exemplarily, in the implementations, the manner in which the cover 300 is movably connected with the adapter body 100 is that the cover 300 is slidable relative to the adapter body 100. For details thereof, reference can be made to the exemplary implementation in which the cover 300 includes a first cover 310 and a second cover 320, and the first cover 310 and the second cover 320 are each connected with the adapter body 100 and are both slidable relative to the adapter body 100. It can be understood that, in other implementations, the cover 300 may be connected with the adapter body 100 in other manners, for example, flip the cover 300 multiple times and then adjust a position of the cover 300, as long as the second end surface 340 and the first end surface 161 can cooperatively form the plugging surface 11 of the power adapter 10.

In schematic views of the implementations, the prong 200 is fixed on the adapter body 100 and exposed at the first end surface 161. The cover 300 is implemented as two covers, that is, the cover 300 includes the first cover 310 and the second cover 320. It can be understood that, in other implementations, the cover 300 is implemented as one cover.

In the implementations, when the cover 300 is in the open state, the first end surface 161 and the second end surface 340 cooperatively form the plugging surface 11 of the power adapter 10, and the first end surface 161 is flush with the second end surface 340.

The plugging surface 11 of the power adapter 10 refers to a surface that fits the socket 50 when the prong 200 of the power adapter 10 is plugged into the socket 50, and the plugging surface 11 meets requirements of safety regulations for the power adapter 10. When the prong 200 of the power adapter 10 is plugged into the socket 50, a surface that merely fits the socket 50 but does not meet the safety regulations for the power adapter 10 cannot be referred to as the plugging surface 11 of the power adapter 10. Specifically, for the power adapter 10, when the prong 200 of the power adapter 10 is plugged into the socket 50, in order to avoid leakage of electrical energy from the socket 50 via the prong 200 that will cause damage to a user, a distance between an edge of the prong 200 and an edge of the plugging surface 11 is required to be larger than or equal to a preset distance (also referred to as a safety distance). In the implementations, when the cover 300 is in the open state, a distance between an edge of the prong 200 close to the cover 300 and an edge of the cover 300 away from the prong 200 is larger than or equal to the preset distance. For example, for the power adapter 10 applicable in China, the preset distance is 6.5 mm. For the power adapter 10 applicable in other countries or regions (such as Europe), the preset distance is other values, such as 5.1 mm or 7.9 mm. In schematic views (such as FIG. 4) of the implementations, when the first cover 310 and the second cover 320 are oppositely open, a distance between the leftmost of the prong 200 and a surface of the first cover 310 away from the adapter body 100 (that is, the leftmost surface of the first cover 310) is larger than or equal to the preset distance; and similarly, a distance between the rightmost of the prong 200 and a surface of the second cover 320 away from adapter body 100 (that is, the rightmost surface of the second cover 320) is larger than or equal to the preset distance.

Specifically, for the case where the cover 300 includes the first cover 310 and the second cover 320, when the first cover 310 and the second cover 320 are both in the open state, a distance between an edge of the prong 200 close to the first cover 310 and an edge of the first cover 310 away from the prong 200 is larger than or equal to 6.5 mm, and a distance between an edge of the prong 200 close to the second cover 320 and an edge of the second cover 320 away from the prong 200 is larger than or equal to 6.5 mm, to meet requirements of safety regulations for the power adapter 10 applicable in China.

For the power adapter 10 applicable in other countries or regions (such as Europe), the distance between the edge of the prong 200 close to the first cover 310 and the edge of the first cover 310 away from the prong 200 is larger than or equal to 5.1 mm, and the distance between the edge of the prong 200 close to the second cover 320 and the edge of the second cover 320 away from prong 200 is larger than or equal to 5.1 mm. Alternatively, the distance between the edge of the prong 200 close to the first cover 310 and the edge of the first cover 310 away from the prong 200 is larger than or equal to 7.9 mm, and the distance between the edge of the prong 200 close to the second cover 320 and the edge of the second cover 320 away from the prong 200 is larger than or equal to 7.9 mm.

In the related art (rather than the existing art), in a power adapter, an end surface of an adapter body on which a prong is disposed constitutes a plugging surface of the power adapter. In other words, in the power adapter in the related art, the plugging surface of the power adapter is formed merely by the end surface of the adapter body on which the prong is disposed. Therefore, in the related art, the adapter body is usually large in thickness. For example, in order to meet the requirements of safety regulations for the power adapter, the thickness of a body of the power adapter (in other words, the width of the plugging surface of the power adapter) is set to a preset thickness (such as 22 mm). The following will analyze the adapter body 100 of the disclosure and the adapter body in the related art in terms of thickness. In related art, the plugging surface of the adapter body is formed merely by the end surface of the adapter body on which the prong is disposed, and therefore, the adapter body of the power adapter in the related art is large in thickness. In contrast, in the power adapter 10 of the disclosure, the plugging surface 11 of the power adapter 10 is constituted cooperatively by the second end surface 340 of the cover 300 and the first end surface 161 of the adapter body 100 on which the prong 200 is disposed, that is, the preset thickness is equal to the sum of the thickness of the adapter body 100 and the thickness of the cover 300. In other words, in the power adapter 10 of the disclosure, the first end surface 161 of the adapter body 100 on which the prong 200 is disposed is merely a part of the plugging surface 11 of the power adapter 10. That is, in the power adapter 10 of the disclosure, the size of the first end surface 161 of the adapter body 100 on which the prong 200 is disposed (i.e. the thickness of the adapter body 100) does not meet the requirements of safety regulations, and can meet the requirements of safety regulations only with aid of the cover 300. As can be seen, the thickness of the adapter body 100 in the power adapter 10 of the disclosure is smaller than that of the adapter body in the related art. Accordingly, the adapter body 100 in the power adapter 10 of the disclosure is thinner than the adapter body in the power adapter in the related art.

Compared with the related art, in the power adapter 10 provided in the disclosure, the cover 300 is connected with the adapter body 100 and slidable relative to the adapter body 100. When the cover 300 is in the closed state, the cover 300 can protect the prong 200 against damage and prevent the prong 200 from damaging other objects. When the power adapter 10 needs to be used, the cover 300 is open and the prong 200 is exposed. In addition, the second end surface 340 of the cover 300 and the first end surface 161 of the adapter body 100 cooperatively form the plugging surface 11 of the power adapter 10. In other words, the first end surface 161 of the adapter body 100 constitutes merely a part of the plugging surface 11 of the power adapter 10, and therefore the adapter body 100 can be made small in thickness, which is beneficial to miniaturization of the power adapter 10. Furthermore, compared with other manners for movement of the cover 300 such as flip of the cover 300 relative to the adapter body 100, in the power adapter 10 provided in implementations of the disclosure, the cover 300 is slidable relative to the adapter body 100. When the cover 300 of the power adapter 10 switches to the open state from the closed state, a vertical distance between the cover 300 and the prong 200 remains unchanged or changes slightly. Accordingly, a vertical distance between the prong 200 and a finger of a user operating the cover 300 remains unchanged or changes slightly. Even when the power adapter 10 is connected with the socket 50, a distance between the finger of the user and the prong 200 can still meet the requirements of safety regulations and thus the finger of the user is not prone to electric shock.

It is to be noted that, the thickness of the adapter body 100 refers to the largest size of the adapter body 100 in a thickness direction.

The cover 300 includes the first cover 310 and the second cover 320. The first cover 310 is connected with and slidable relative to the adapter body 100, and the first cover 310 has a first end subsurface 311. The second cover 320 is connected with and slidable relative to the adapter body 100, and the second cover 320 has a second end subsurface 321. The second end surface 340 includes the first end subsurface 311 and the second end subsurface 321. When the first cover 310 and the second cover 320 are in the closed state, the first end subsurface 311 and the second end subsurface 321 are away from the adapter body 100. When the first cover 310 and the second cover 320 are both in the open state, the first end subsurface 311 is disposed at one of two opposite sides of the first end surface 161, the second end subsurface 321 is disposed at the other one of the two opposite sides of the first end surface 161, and the first end subsurface 311, the second end subsurface 321, and the first end surface 161 cooperatively form the plugging surface 11 of the power adapter 10.

When the first cover 310 is in the closed state, the first end subsurface 311 is away from the adapter body 100. "The first end subsurface 311 is away from the adapter body 100" means that the first end subsurface 311 is away from the first end surface 161 of the adapter body 100. When the first cover 310 slides relative to the adapter body 100 to be gradually open from the closed state, the first end subsurface 311 is gradually close to the first end surface 161 of the adapter body 100 until the first cover 310 is fully in the open state relative to the adapter body 100, and in this case, the first end subsurface 311 is flush or substantially flush with the first end surface 161. Accordingly, when the first cover 310 is in the open state relative to the adapter body 100, the first end subsurface 311 is flush or substantially flush with the first end surface 161. When the first cover 310 slides relative to the adapter body 100 to be gradually closed from the open state, the first end subsurface 311 is gradually away from the first end surface 161 of the adapter body 100 until the first cover 310 is fully in the closed state relative to the adapter body 100. In this case, a distance between the first end subsurface 311 and the first end surface 161 of the adapter body 100 is the largest, and the power adapter 10 is the largest in length.

Similarly, when the second cover 320 is in the closed state, the second end subsurface 321 is away from the adapter body 100. "The second end subsurface 321 is away from the adapter body 100" means that the second end subsurface 321 is away from the first end surface 161 of the adapter body 100. When the second cover 320 slides relative to the adapter body 100 to be gradually open from the closed state, the second end subsurface 321 is gradually close to the first end surface 161 of the adapter body 100 until the second cover 320 is fully in the open state relative to the adapter body 100, and in this case, the second end subsurface 321 is flush or substantially flush with the first end surface 161. Accordingly, when the second cover 320 is in the open state relative to the adapter body 100, the second end subsurface 321 is flush or substantially flush with the first end surface 161. When the second cover 320 slides relative to the adapter body 100 to be gradually closed from the open state, the second end subsurface 321 is gradually away from the first end surface 161 of the adapter body 100 until the second cover 320 is fully in the closed state relative to the adapter body 100. In this case, a distance between the second end subsurface 321 and the first end surface 161 of the adapter body 100 is the largest, and the power adapter 10 is the largest in length.

When the first cover 310 and the second cover 320 are both in the open state, the first cover 310 is disposed at one of two opposite sides of the adapter body 100, and the second cover 320 is disposed at the other one of the two opposite sides of the adapter body 100. Accordingly, the first end subsurface 311 is disposed at one of two opposite sides of the first end surface 161, and the second end subsurface 321 is disposed at the other one of the two opposite sides of the first end surface 161. In other words, the first end surface 161 is sandwiched between the first end subsurface 311 and the second end subsurface 321. When the first cover 310 and the second cover 320 are both in the open state, the first end subsurface 311, the second end subsurface 321, and the first end surface 161 are flush with each other, which is convenient for plugging the prong 200 into the socket 50.

When the first cover 310 and the second cover 320 are both in the open state, the power adapter 10 is the smallest in length. When the first cover 310 and the second cover 320 are both in the closed state, the power adapter 10 is the largest in length.

Figure 5:
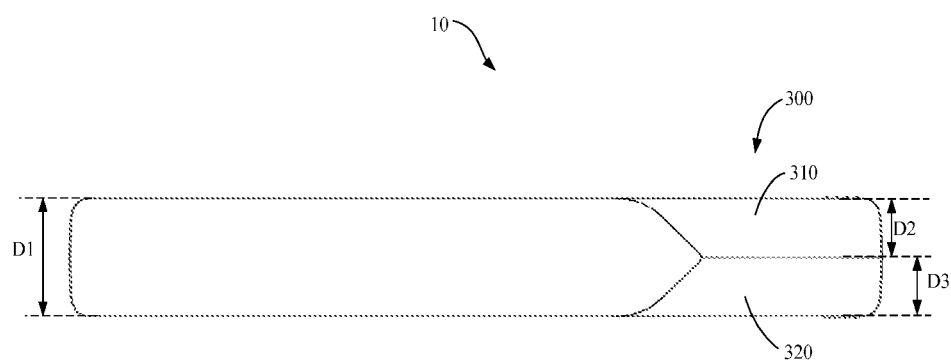
FIG. 5 is a schematic view of the power adapter provided in an implementation of the present disclosure, illustrating sizes of components of the power adapter when a first cover and a second cover of the power adapter are in a closed state.
Figure 6:
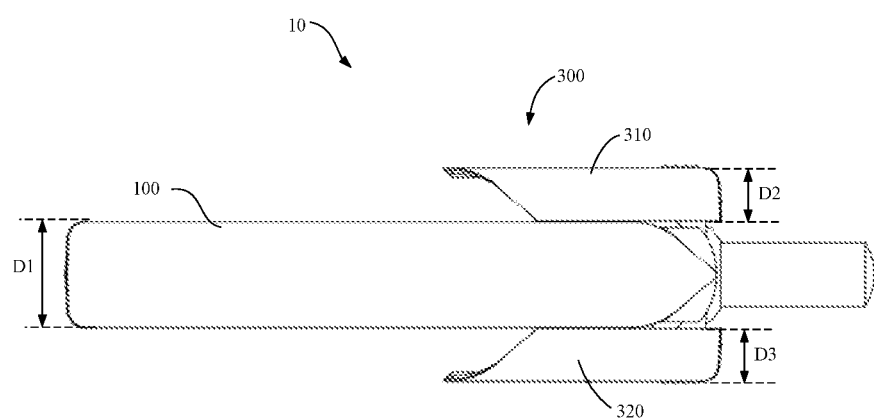
FIG. 6 is a schematic view illustrating sizes of components of the power adapter in FIG. 5 when the first cover and the second cover of the power adapter are in an open state.

Referring to FIG. 5 and FIG. 6, FIG. 5 is a schematic view of the power adapter provided in an implementation of the disclosure, illustrating sizes of components of the power adapter when the first cover and the second cover of the power adapter are in the closed state; and FIG. 6 is a schematic view illustrating sizes of components of the power adapter in FIG. 5 when the first cover and the second cover of the power adapter are in the open state.

In the implementations, a thickness D1 of the adapter body 100 fulfills 6.3 mm≤D1≤14 mm, a thickness D2 of the first cover 310 fulfills 4.825 mm≤D2≤7 mm, and a thickness D3 of the second cover 320 fulfills 4.825 mm≤D3≤7 mm.

For the power adapter 100 applicable in China, the width of the prong 200 is usually 6.3 mm according to the requirements of safety regulations, and therefore D1≥6.3 mm. In order for lightness and thinness of the power adapter 10, the thickness D1 of the adapter body 100 fulfills D1≤14 mm.

In an implementation, the thickness D1 of the adapter body 100 fulfills 9.65 mm≤D1≤14 mm, the thickness D2 of the first cover 310 fulfills 4.825 mm≤D2≤7 mm, and the thickness D3 of the second cover 320 fulfills 4.825 mm≤D3≤7 mm.

In an implementation, the thickness D2 of the first cover 310 is equal to the thickness D3 of the second cover 320, and the sum of the thickness D2 of the first cover 310 and the thickness D3 of the second cover 320 is equal to the thickness D1 of the adapter body 100.

The sizes above are designed according to the requirements of safety regulations for the power adapter 10 rather than arbitrarily selected. Specifically, when the first cover 310 and the second cover 320 are both in the open state, based on the requirements of safety regulations, a distance between a side face of the prong 200 close to the first cover 310 and the outermost of the first cover 310 is required to be larger than or equal to 6.5 mm, to avoid leakage when the power adapter 10 is plugged into the socket 50 via the prongs 200, thereby avoiding damage to the user. Similarly, based on the requirements of safety regulations, a distance between a side face of the prong 200 close to the second cover 320 and the outermost of the second cover 320 is required to be larger than or equal to 6.5 mm. Accordingly, the width of the prong 200 is 6.3 mm based on the requirements of safety regulations. Therefore, a minimum value of a sum of the thickness D1 of the adapter body 100, the thickness D2 of the first cover 310, and the thickness D3 of the second cover 320 is D1+D2+D3=6.3 mm+6.5 mm+6.5 mm=19.3 mm. In this case, if the sum of the thickness D2 of the first cover 310 and the thickness D3 of the second cover 320 is equal to the thickness D1 of the adapter body 100, a minimum value of the thickness D1 of the adapter body 100 is 19.3 mm/2=9.65 mm. If the thickness of the first cover 310 is equal to the thickness of the second cover 320, D2=D3=9.65 mm/2=4.825 mm, that is, a minimum value of the thickness of the first cover 310 is 4.825 mm, and a minimum value of the thickness of the second cover 320 is 4.825 mm. Since the thickness of the adapter body of an existing power adapter is usually larger than 14 mm, in order for thinness of the adapter body 100 of the power adapter 10 in the disclosure, an upper limit for the thickness of the adapter body 100 may be determined to be 14 mm. If the thickness of the first cover 310 is equal to the thickness of the second cover 320, and the sum of the thickness of the first cover 310 and the thickness of the second cover 320 is equal to the thickness of the adapter body 100, an upper limit for the thickness of the first cover 310 is 7 mm, and an upper limit for the thickness of the second cover 320 is 7 mm.

Figure 7:
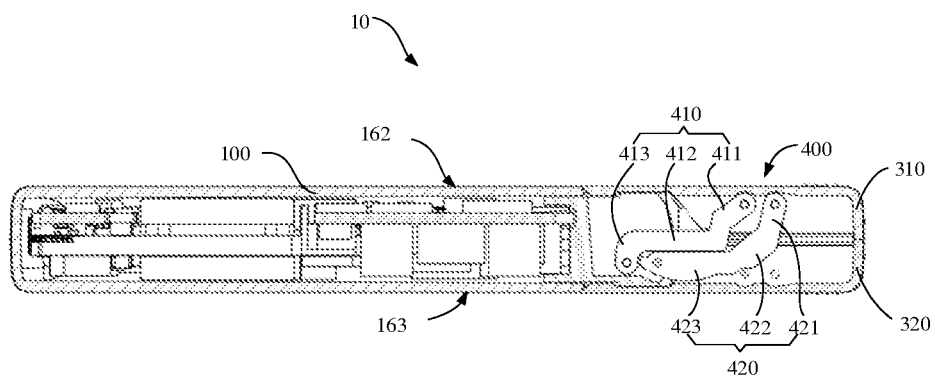
FIG. 7 is a schematic cross-sectional view of the power adapter in FIG. 2, taken along line I-I.

The following will elaborate the manner in which the first cover 310 and the second cover 320 are connected with the adapter body 100. Referring to FIG. 7, FIG. 7 is a schematic cross-sectional view of the power adapter in FIG. 2, taken along line I-I. The power adapter 10 further includes a first sliding assembly 400 and a second sliding assembly 500 (see FIG. 10). The first sliding assembly 400 has one end rotatably connected with the first cover 310 and the other end rotatably connected with the adapter body 100, such that the first cover 310 is slidable relative to the adapter body 100. The second sliding assembly 500 has one end rotatably connected with the second cover 320 and the other end rotatably connected with the adapter body 100, such that the second cover 320 is slidable relative to the adapter body 100.

In the implementations, the first sliding assembly 400 and the second sliding assembly 500 exemplarily have the same structure. It can be understood that, in other implementations, the first sliding assembly 400 may be structured differently from the second sliding assembly 500, as long as the first cover 310 is slidable relative to the adapter body 100 with aid of the first sliding assembly 400, and the second cover 320 is slidable relative to the adapter body 100 with aid of the second sliding assembly 500.

The first sliding assembly 400 includes a first connecting member 410. The first connecting member 410 has a first rotating portion 411, a first connecting portion 412, and a second rotating portion 413 that are sequentially connected. The first rotating portion 411 is rotatably connected with the first cover 310, and the second rotating portion 413 is rotatably connected with the adapter body 100.

The manner in which the first rotating portion 411 is rotatably connected with the first cover 310 is elaborated as follows. In the implementations, the first rotating portion 411 defines a mounting hole (blind hole or through hole), and accordingly, the first cover 310 defines a mounting hole (blind hole or through hole). A rotation connecting member (such as a pin shaft) penetrates through the mounting hole of the first rotating portion 411 and the mounting hole of the first cover 310, such that the first rotating portion 411 is rotatably connected with the first cover 310. The first rotating portion 411 may also be rotatably connected with the first cover 310 in other manners. For example, the first rotating portion 411 is provided with a rotating member, and the first cover 310 defines a mounting hole, the rotating member is disposed in the mounting hole and is rotatable in the mounting hole, such that the first rotating portion 411 is rotatably connected with the first cover 310. Alternatively, the first rotating portion 411 defines a mounting hole, and the first cover 310 is provided with a rotating member, where the rotating member is disposed in the mounting hole and is rotatable in the mounting hole, such that the first rotating portion 411 is rotatably connected with the first cover 310.

The manner in which the second rotating portion 413 is rotatably connected with the adapter body 100 is elaborated as follows. In the implementations, the second rotating portion 413 defines a mounting hole, and accordingly, the adapter body 100 defines a mounting hole. A rotation connecting member (such as a pin shaft) penetrates through the mounting hole of the second rotating portion 413 and the mounting hole of the adapter body 100, such that the second rotating portion 413 is rotatably connected with the adapter body 100. Similarly, the second rotating portion 413 may also be rotatably connected with the adapter body 100 in other manners. For example, the second rotating portion 413 is provided with a rotating member, and the adapter body 100 defines a mounting hole, where the rotating member is disposed in the mounting hole and is rotatable in the mounting hole, such that the second rotating portion 413 is rotatably connected with the adapter body 100. Alternatively, the second rotating portion 413 defines a mounting hole, and the adapter body 100 is provided with a rotating member, where the rotating member is disposed in the mounting hole and is rotatable in the mounting hole, such that the second rotating portion 413 is rotatably connected with the adapter body 100.

In addition, in the implementations, the adapter body 100 further has a first surface 162 and a second surface 163. The first surface 162 and the second surface 163 are each connected with the first end surface 161 and are disposed opposite to each other. The first surface 162 is disposed close to the first cover 310, and the second surface 163 is disposed close to the second cover 320. The first sliding assembly 400 further includes a second connecting member 420. The second connecting member 420 has a third rotating portion 421, a second connecting portion 422, and a fourth rotating portion 423 that are sequentially connected. The third rotating portion 421 is rotatably connected with the first cover 310, and the fourth rotating portion 423 is rotatably connected with the adapter body 100. A connecting point between the second rotating portion 413 and the adapter body 100 and a connecting point between the fourth rotating portion 423 and the adapter body 100 are both away from the first surface 162.

When the first cover 310 and the second cover 320 are both in the closed state, the first surface 162 and the second surface 163 each constitute a part of an appearance surface of the power adapter 10. When the first cover 310 and the second cover 320 are both in the open state, at least a part of the first surface 162 is covered by the first cover 310, and at least a part of the second surface 163 is covered by the second cover 320.

In the implementations, the third rotating portion 421 is rotatably connected with the first cover 310 in the same manner as the first rotating portion 411 is rotatably connected with the first cover 310. In the implementations, the third rotating portion 421 defines a mounting hole, and accordingly, the first cover 310 defines a mounting hole. A rotation connecting member penetrates through the mounting hole of the third rotating portion 421 and the mounting hole of the first cover 310, such that the third rotating portion 421 is rotatably connected with the first cover 310. The third rotating portion 421 may also be rotatably connected with the first cover 310 in other manners. For example, the third rotating portion 421 is provided with a rotating member, and the first cover 310 defines a mounting hole, where the rotating member is disposed in the mounting hole and is rotatable in the mounting hole, such that the third rotating portion 421 is rotatably connected with the first cover 310. Alternatively, the third rotating portion 421 defines a mounting hole, and the first cover 310 is provided with a rotating member, where the rotating member is disposed in the mounting hole and is rotatable in the mounting hole, such that the third rotating portion 421 is rotatably connected with the first cover 310. It can be understood that, in other implementations, the manner in which the third rotating portion 421 is rotatably connected with the first cover 310 is different from the manner in which the first rotating portion 411 is rotatably connected with the first cover 310.

In the implementations, the fourth rotating portion 423 is rotatably connected with the adapter body 100 in the same manner as the second rotating portion 413 is rotatably connected with the adapter body 100. In the implementations, the fourth rotating portion 423 defines a mounting hole, and accordingly, the adapter body 100 defines a mounting hole. A rotation connecting member (such as a pin shaft) penetrates through the mounting hole of the fourth rotating portion 423 and the mounting hole of the adapter body 100, such that the fourth rotating portion 423 is rotatably connected with the adapter body 100. Similarly, the fourth rotating portion 423 may also be rotatably connected with the adapter body 100 in other manners. For example, the fourth rotating portion 423 is provided with a rotating member, and the adapter body 100 defines a mounting hole, where the rotating member is disposed in the mounting hole and is rotatable in the mounting hole, such that the fourth rotating portion 423 is rotatably connected with the adapter body 100. Alternatively, the fourth rotating portion 423 defines a mounting hole, and the adapter body 100 is provided with a rotating member, where the rotating member is disposed in the mounting hole and is rotatable in the mounting hole, such that the fourth rotating portion 423 is rotatably connected with the adapter body 100. It can be understood that, in other implementations, the manner in which the fourth rotating portion 423 is rotatably connected with the adapter body 100 is different from the manner in which the second rotating portion 413 is rotatably connected with the adapter body 100.

The connecting point between the second rotating portion 413 and the adapter body 100 and the connecting point between the fourth rotating portion 423 and the adapter body 100 are both away from the first surface 162, which is possible to reduce a space size of the adapter body 100 in terms of thickness, such that the power adapter 10 can be small in thickness.

In schematic views of the implementations, the first sliding assembly 400 exemplarily includes the first connecting member 410 and the second connecting member 420. It can be understood that, in other implementations, the first sliding assembly 400 includes the first connecting member 410 rather than the second connecting member 420. If the first sliding assembly 400 includes not only the first connecting member 410 but also the second connecting member 420, the first cover 310 can be connected with the adapter body 100 stably, such that the first cover 310 can move relative to the adapter body 100 steadily and is not prone to shaking, and does not tend to skew and swing.

Exemplarily, in the implementations, each rotatable connecting member is a pin shaft. The first rotating portion 411 of the first connecting member 410 is fixed at the first cover 310 through a rotatable connecting member, and the second rotating portion 413 of the first connecting member 410 is fixed at the adapter body 100 through a rotatable connecting member. The third rotating portion 421 of the second connecting member 420 is fixed at the first cover 310 through a rotatable connecting member, and the fourth rotating portion 423 of the second connecting member 420 is fixed at the adapter body 100 through a rotatable connecting member. In the implementations, the adapter body 100, the first connecting member 410, the second connecting member 420, and the first cover 310 constitute a four-bar mechanism. The adapter body 100 functions as a frame of the four-bar mechanism, the first connecting member 410 and the second connecting member 420 function as connecting rods of the four-bar mechanism, and the first cover 310 functions as a linkage assembly of the four-bar mechanism.

Figure 8:
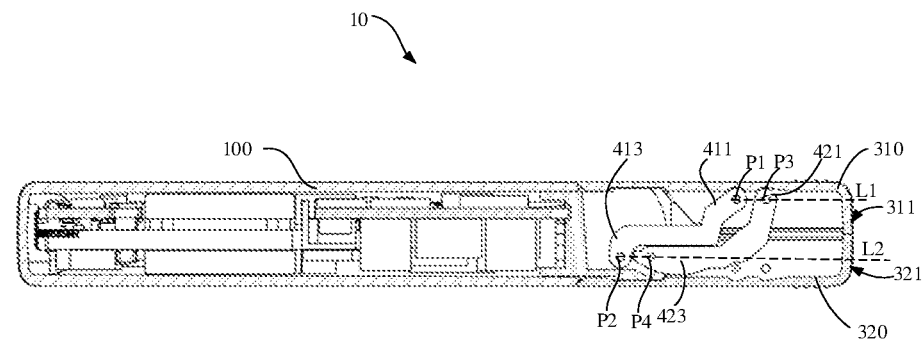
FIG. 8 is a schematic view illustrating relationships between components of the power adapter illustrated in FIG. 7.
Figure 9:
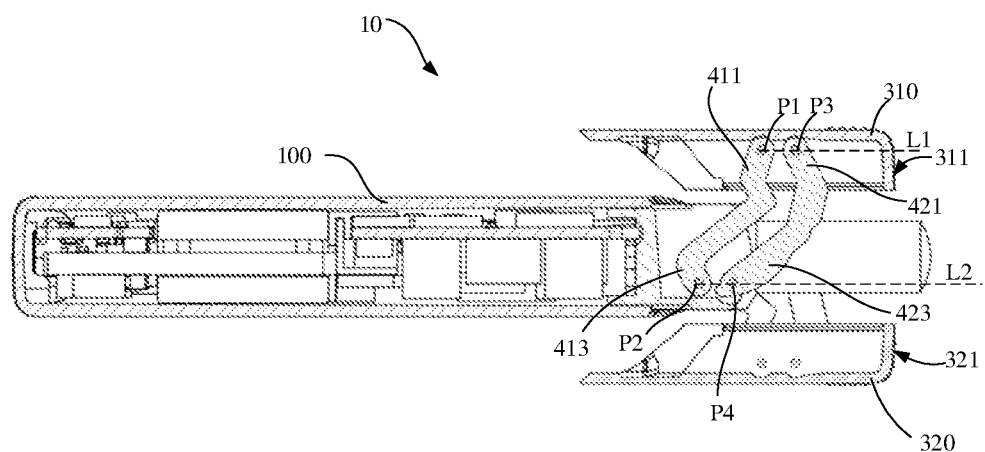
FIG. 9 is a schematic view of the power adapter illustrated in FIG. 3 when in a semi-open state.
Figure 10:
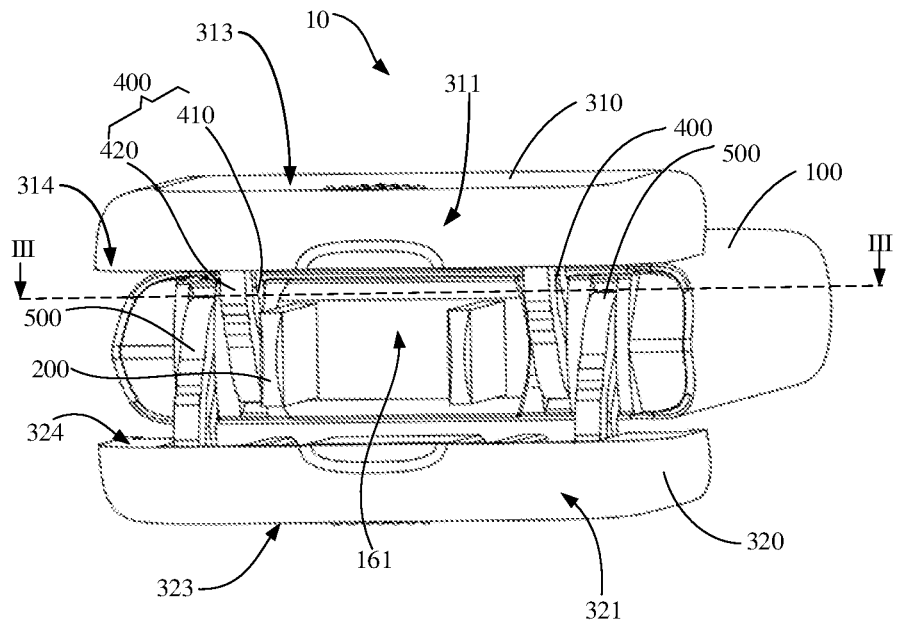
FIG. 10 is a schematic view of the power adapter in FIG. 9, viewed from another direction.

Referring to FIG. 8 to FIG. 10, FIG. 8 is a schematic view illustrating relationships between components of the power adapter illustrated in FIG. 7, FIG. 9 is a schematic view of the power adapter illustrated in FIG. 3 when in a semi-open state, and FIG. 10 is a schematic view of the power adapter in FIG. 9, viewed from another direction. A point at which the first rotating portion 411 is rotatably connected with the first cover 310 is a first connecting point P1, the connecting point between the second rotating portion 413 and the adapter body 100 is a second connecting point P2, and a point at which the third rotating portion 421 is rotatably connected with the first cover 310 is a third connecting point P3. When the first cover 310 is in the closed state, the third connecting point P3 is farther away from the first end surface 161 than the first connecting point P1. The connecting point between the fourth rotating portion 423 and the adapter body 100 is a fourth connecting point P4, where the fourth connecting point P4 is closer to the first end surface 161 than the second connecting point P2. A line L1 between the first connecting point P1 and the third connecting point P3 is parallel to a line L2 between the second connecting point P2 and the fourth connecting point P4.

In the power adapter 10 above, the line L1 between the first connecting point P1 and the third connecting point P3 is set to be parallel to the line L2 between the second connecting point P2 and the fourth connecting point P4. As such, the first cover 310 can move relative to the adapter body 100 steadily and is not prone to shaking, and does not tend to skew and swing.

The semi-open state refers to a state between the open state and the closed state. Specifically, when the first cover 310 is in the semi-open state, the first cover 310 is in a state between the closed state and the open state. When the second cover 320 is in the semi-open state, the second cover 320 is in a state between the closed state and the open state. When the first cover 310 and the second cover 320 are both in the semi-open state, the power adapter 10 may be considered to be in the semi-open state. Accordingly, when the first cover 310 and the second cover 320 are both in the open state, the power adapter 10 may be considered to be in the open state. When the first cover 310 and the second cover 320 are both in the closed state, the power adapter 10 is in the closed state.

When the first cover 310 and the second cover 320 are both in the semi-open state, the prong 200 is partially or completely exposed. In schematic views of the implementations, when the first cover 310 and the second cover 320 are both in the semi-open state, the prong 200 is completely exposed. As can be seem from the schematic view of the power adapter 10 when in the semi-open state, the second connecting member 420 is closer to the first end surface 161 than the first connecting member 410, and the first connecting member 410 is partially covered by the second connecting member 420. As can be seem from the schematic view of the power adapter 10 when in the open state, the first connecting member 410 is completely covered by the second connecting member 420. In other implementations, when the power adapter 10 is in the open state, the first connecting member 410 is partially covered by the second connecting member 420. For example, if the thickness of the first connecting member 410 is larger than that of the second connecting member 420, and the width of an opening of the first end surface 161 is larger than the thickness of the first connecting member 410, the first connecting member 410 is partially covered by the second connecting member 420 when the power adapter 10 is in the open state.

As can be seen, the third connecting point P3 is farther away from the first end surface 161 than the first connecting point P1, and the fourth connecting point P4 is closer to the first end surface 161 than the second connecting point P2, such that the first connecting member 410 is partially or completely covered by the second connecting member 420 when the first cover 310 and the second cover 320 are both in the open state. Therefore, the third connecting point P3 is farther away from the first end surface 161 than the first connecting point P1, and the fourth connecting point P4 is closer to the first end surface 161 than the second connecting point P2, and in this way, it is only necessary that the width of the opening defined on the first end surface 161 fits the thickness of the second connecting member 420. As such, the width of the opening defined on the first end surface 161 can be relatively small, such that it will not be easy for dust or the like to enter into the adapter body 100 through the opening. "The width of the opening defined on the first end surface 161 fits the thickness of the second connecting member 420" means that the width of the opening defined on the first end surface 161 is equal to the thickness of the second connecting member 420, or larger than the thickness of the second connecting member 420 by a preset size, where the preset size is usually small, such as 0.02 mm.

In the implementations, a distance between the first connecting point P1 and the second connecting point P2 is equal to a distance between the third connecting point P3 and the fourth connecting point P4.

The distance between the first connecting point P1 and the second connecting point P2 is a first distance, and the distance between the third connecting point P3 and the fourth connecting point P4 is a second distance, where the first distance is equal to the second distance. As such, when the first cover 310 is open, the first end subsurface 311 is flush with the first end surface 161, and the first cover 310 is attached to the adapter body 100.

Figure 11:
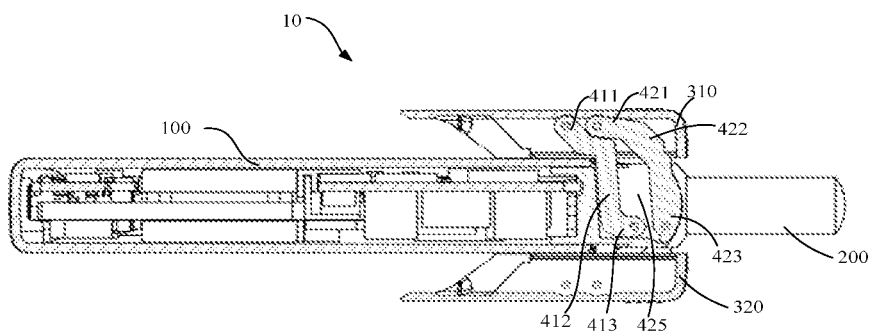
FIG. 11 is a schematic cross-sectional view of the power adapter when fully open.

Referring to FIG. 7 together with FIG. 11, FIG. 11 is a schematic cross-sectional view of the power adapter when fully open. The third rotating portion 421, the second connecting portion 422, and the fourth rotating portion 423 are sequentially connected in a bent manner, to define an avoidance space 425 that faces the first connecting member 410. The avoidance space 425 is used for avoiding interference between the first connecting member 410 and the second connecting member 420 during rotation of the first connecting member 410 and the second connecting member 420. When the first cover 310 is in the closed state, the first connecting portion 412 abuts against the fourth rotating portion 423. When the first cover 310 is in the open state, the first rotating portion 411 abuts against the third rotating portion 421.

With the avoidance space 425, it is possible to avoid interference between the first connecting member 410 and the second connecting member 420 during rotation of the first connecting member 410 and the second connecting member 420. In other words, due to the avoidance space 425, the first cover 310 is rotatable relative to the adapter body 100, such that the first cover 310 can switch between the closed state and the open state. In addition, when the first connecting portion 412 abuts against the fourth rotating portion 423, the first cover 310 cannot further close relative to the adapter body 100, such that the first cover 310 is in the closed state. When the first rotating portion 411 abuts against the third rotating portion 421, the first cover 310 cannot further open relative to the adapter body 100, such that the first cover 310 is in the open state. As can be seen, with the above structures of the first connecting member 410 and the second connecting member 420, on one hand, it is possible to avoid interference between the first connecting member 410 and the second connecting member 420 when the first cover 310 rotates relative to the adapter body 100, thereby ensuring smooth rotation of the first cover 310 relative to the adapter body 100; on the other hand, the first cover 310 can be in the open state or the closed state.

Referring to FIG. 10 and FIG. 11 again, the first end surface 161 defines the opening. When the first cover 310 is in the open state, a surface of the fourth rotating portion 423 away from the first connecting member 410 is exposed at the opening and does not exceed the first end surface 161.

"When the first cover 310 is in the open state, the surface of the fourth rotating portion 423 away from the first connecting member 410 is exposed at the opening and does not exceed the first end surface 161" may mean that the surface of the fourth rotating portion 423 away from the first connecting member 410 is lower than the first end surface 161 or flush with the first end surface 161. When the first cover 310 is in the open state, the surface of the fourth rotating portion 423 away from the first connecting member 410 does not exceed the first end surface 161, and as such, a part of the fourth rotating portion 423 that is exposed at the opening does not adversely affect use of the power adapter 10. Specifically, the prongs 200 of the power adapter 10 will be exempt from interference when being plugged into the socket 50.

In the implementations, a surface of the fourth rotating portion 423 away from the first connecting portion 412 is an arc surface. When the first cover 310 is open, the arc surface is exposed at the opening of the first end surface 161, which is conducive to aesthetic beauty of a part of the first cover 310 that is exposed at the opening.

In addition, the surface of the fourth rotating portion 423 away from the first connecting portion 412 may be flush with a front arc-surface of the adapter body 100.

Referring to FIG. 10 again, the first sliding assembly 400 is implemented as two first sliding assemblies 400, and the two first sliding assemblies 400 are spaced apart from each other. When the first cover 310 is in the closed state, the prongs 200 are between the two first sliding assemblies 400.

The first sliding assembly 400 is implemented as two first sliding assemblies 400, such that the first cover 310 can move relative to the adapter body 100 steadily and is not prone to shaking. In addition, when the first cover 310 is in the closed state, the prongs 200 are between the two first sliding assemblies 400. In other words, one of the two first sliding assemblies 400 is disposed at one side of the two prongs 200, and the other one of the two first sliding assemblies 400 is disposed at the other side of the two prongs 200, which further facilitates steady movement of the first cover 310 relative to the adapter body 100 and prevents shaking. Furthermore, the positions of the first sliding assemblies 400 described above can make it more convenient for arrangement of the first sliding assemblies 400.

Referring to FIG. 10 again, the second sliding assembly 500 is implemented as two sliding assemblies 500, and the two second sliding assemblies 500 are spaced apart from each other. When the second cover 320 is in the closed state, the prongs 200 are disposed between the two second sliding assemblies 500, and for the first sliding assembly 400 and the second sliding assembly 500 that are at the same side of the prong 200, the second sliding assembly 500 is farther away from the prong 200 than the first sliding assembly 400.

The second sliding assembly 500 is implemented as two second sliding assemblies 500, such that the second cover 320 can move relative to the adapter body 100 steadily and is not prone to shaking. In addition, when the second cover 320 is in the closed state, the prongs 200 are between the two second sliding assemblies 500. In other words, one of the two second sliding assemblies 500 is disposed at one side of the two prongs 200, and the other one of the two second sliding assemblies 500 is disposed at the other side of the two prongs 200, which further facilitates steady movement of the second cover 320 relative to the adapter body 100 and prevents shaking. Furthermore, the positions of the second sliding assemblies 500 described above can make it more convenient for arrangement of the second sliding assemblies 500.

Figure 12:
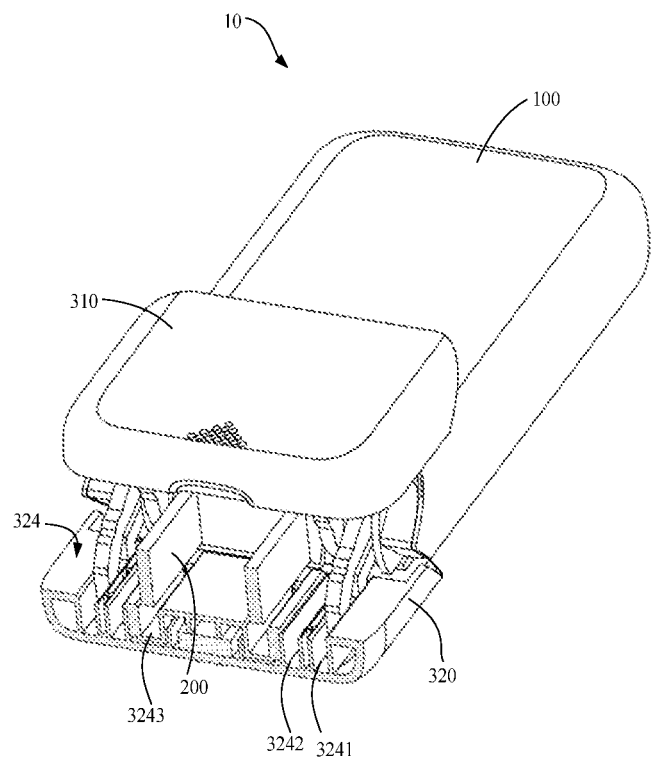
FIG. 12 is a cross-sectional view of the power adapter in FIG. 10 when in the semi-open state, taken along line III-III.

Referring to FIG. 10 together with FIG. 12, FIG. 12 is a cross-sectional view of the power adapter in FIG. 10 when in the semi-open state, taken along line III-III. The first cover 310 has a fifth surface 313 and a sixth surface 314 that are disposed opposite to each other, and the fifth surface 313 and the sixth surface 314 are each connected with the first end subsurface 311. The fifth surface 313 constitutes a part of the appearance surface of the power adapter 10 when the first cover 310 is in the closed state, and the fifth surface 313 is farther away from the first surface 162 than the sixth surface 314 when the first cover 310 is in the open state. The second cover 320 has a third surface 323 and a fourth surface 324. The third surface 323 and the fourth surface 324 are each connected with the second end subsurface 321. The third surface 323 constitutes a part of an appearance surface of the power adapter 10. The fourth surface 324 is disposed opposite to the third surface 323. The fourth surface 324 defines a limiting portion 3241, where the limiting portion 3241 is used for preventing shaking of the second sliding assembly 500.

In the implementations, the limiting portion 3241 is a groove. Referring to FIG. 12 again, in the implementations, the fourth surface 324 further defines a first accommodating portion 3242 and a second accommodating portion 3243. When the first cover 310 and the second cover 320 are in the closed state, the first accommodating portion 3242 accommodates at least a part of the first connecting member 410 and at least a part of the second connecting member 420, and the second accommodating portion 3243 accommodates the prong 200.

It can be understood that, in the implementations, the limiting portion 3241, the first accommodating portion 3242, and the second accommodating portion 3243 are defined on the fourth surface 324 for illustration. In other implementations, the limiting portion 3241, the first accommodating portion 3242, and the second accommodating portion 3243 are defined on a surface of the first cover 310, where the surface of the first cover 310 faces the second cover 320 when the first cover 310 and the second cover 320 are both closed. In other implementations, a part of the limiting portion 3241, the first accommodating portion 3242, and the second accommodating portion 3243 is defined at the first cover 310, and the remaining part of the limiting portion 3241, the first accommodating portion 3242, and the second accommodating portion 3243 is defined at the second cover 320. In other implementations, a part of the second accommodating portion 3243 is defined at the first cover 310, and the remaining part of the second accommodating portion 3243 is defined at the second cover 320.

In other words, the second accommodating portion 3243 is defined at at least one of the first cover 310 or the second cover 320. The second accommodating portion 3243 is also referred to as an accommodating cavity, where the prong 200 is accommodated in the accommodating cavity when the first cover 310 and the second cover 320 are both in the closed state.

In the implementations, the first accommodating portion 3242 is a groove, and the second accommodating portion 3243 is also a groove.

Figure 13:
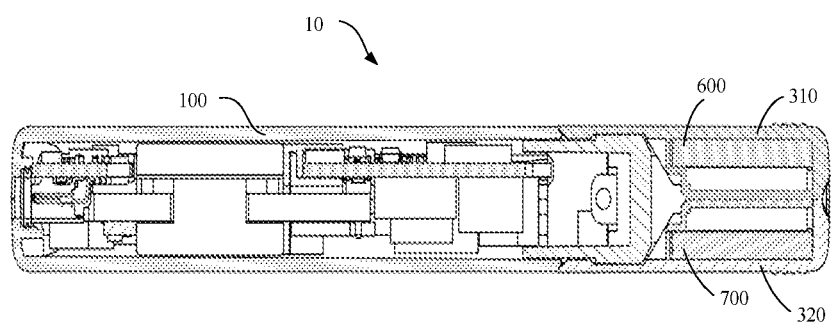
FIG. 13 is a schematic cross-sectional view of the power adapter illustrated in FIG. 2, taken along line IV-IV.

Referring FIG. 2 together with FIG. 13, FIG. 13 is a schematic cross-sectional view of the power adapter illustrated in FIG. 2, taken along line IV-IV. In the implementations, the power adapter 10 further includes a first magnetic member 600 and a second magnetic member 700. For the convenience of illustration, the first sliding assembly 400 and the second sliding assembly 500 are omitted in the schematic view (i.e. FIG. 13) of the implementations. The first magnetic member 600 is carried on the first cover 310. The second magnetic member 700 is carried on the second cover 320. When the first cover 310 and the second cover 320 are both in the closed state, a magnetic force between the first magnetic member 600 and the second magnetic member 700 makes the first cover 310 and the second cover 320 be fixed at the same side of the first end surface 161. When the first cover 310 and the second cover 320 are both in the open state, the magnetic force between the first magnetic member 600 and the second magnetic member 700 makes the first cover 310 and the second cover 320 each be fixed on the adapter body 100.

Specifically, the first magnetic member 600 includes a first magnetic pole and a second magnetic pole, and the second magnetic member 700 also includes a first magnetic pole and a second magnetic pole. The first magnetic pole is a north (N) pole, and a second magnetic pole is a south (S) pole; or the first magnetic pole is an S pole, and the second magnetic pole is an N pole. When the first cover 310 and the second cover 320 are both in the closed state, the first magnetic pole of the first magnetic member 600 faces the second magnetic pole of the second magnetic member 700. Accordingly, an attractive magnetic force is generated between the first magnetic member 600 and the second magnetic member 700, such that the first cover 310 and the second cover 320 can be fixed together and are not prone to separation.

The first magnetic member 600 may be, but is not limited to, a permanent magnet or an electromagnet, and accordingly, the second magnetic member 700 may be, but is not limited to, a permanent magnet or an electromagnet. In the implementations, the first magnetic member 600 is a magnetic iron, and the second magnetic member 700 is also a magnetic iron.

In the implementations, "the first magnetic member 600 is carried on the first cover 310" may mean that the first magnetic member 600 is disposed in an accommodating cavity defined at the first cover 310. "The second magnetic member 700 is carried on the second cover 320" may mean that the second magnetic member 700 is disposed in an accommodating cavity defined at the second cover 320.

Figure 14:
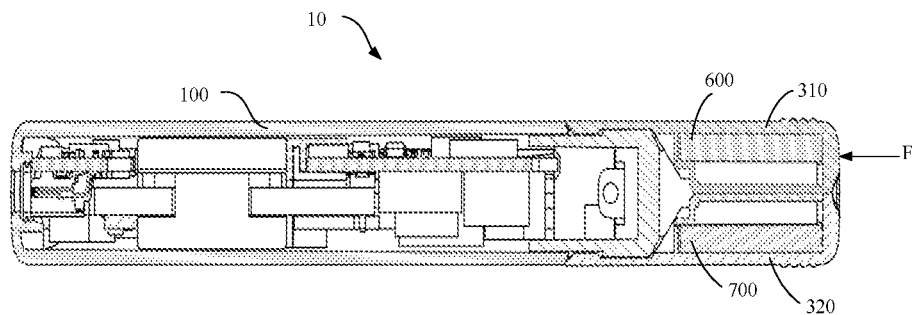
FIG. 14 is a schematic view illustrating application of a pushing force to the first cover of the power adapter in FIG. 13.

Referring to FIG. 14, FIG. 14 is a schematic view illustrating application of a pushing force to the first cover of the power adapter in FIG. 13. When the first cover 310 and the second cover 320 are both in the closed state and a pushing force F is applied to the first cover 310 to slide the first cover 310, for example, the first cover 310 is pushed towards the adapter body 100 by a finger of a user, due to the magnetic force between the first magnetic member 600 and the second magnetic member 700, the second cover 320 slides following sliding of the first cover 310, and when the first cover 310 does not further move and stays in the open state, the second cover 320 also does not further move and stays in the open state. When the first cover 310 and the second cover 320 are both in the open state, the magnetic force between the first magnetic member 600 and the second magnetic member 700 makes the first cover 310 be fixed at one of two opposite sides of the adapter body 100 and makes the second cover 320 be fixed at the other one of the two opposite sides of the adapter body 100.

Accordingly, when the first cover 310 and the second cover 320 are both in the open state and a pushing force is applied to the first cover 310 to slide the first cover 310, for example, the first cover 310 is pushed towards the prong 200 by the finger of the user, due to the magnetic force between the first magnetic member 600 and the second magnetic member 700, the second cover 320 slides following sliding of the first cover 310, and when the first cover 310 does not further move and stays in the closed state, the second cover 320 also does not further move and stays in the closed state. When the first cover 310 and the second cover 320 are both in the closed state, the magnetic force between the first magnetic member 600 and the second magnetic member 700 makes the first cover 310 and the second cover 320 be fixed at the same side of the first end surface 161 of the adapter body 100.

When a pushing force is applied to the first cover 310 to slide the first cover 310, the second cover 320 slides following sliding of the first cover 310 due to the magnetic force between the first magnetic member 600 and the second magnetic member 700. It can be understood that, when a pushing force is applied to the second cover 320 to slide the second cover 320, the first cover 310 slides following sliding of the second cover 320 due to the magnetic force between the first magnetic member 600 and the second magnetic member 700. As can be seen, with aid of the first magnetic member 600 and the second magnetic member 700, synchronous movement between the first cover 310 and the second cover 320 can be realized as long as a pushing force is applied to any one of the first cover 310 and the second cover 320 of the cover 300.

Figure 15:
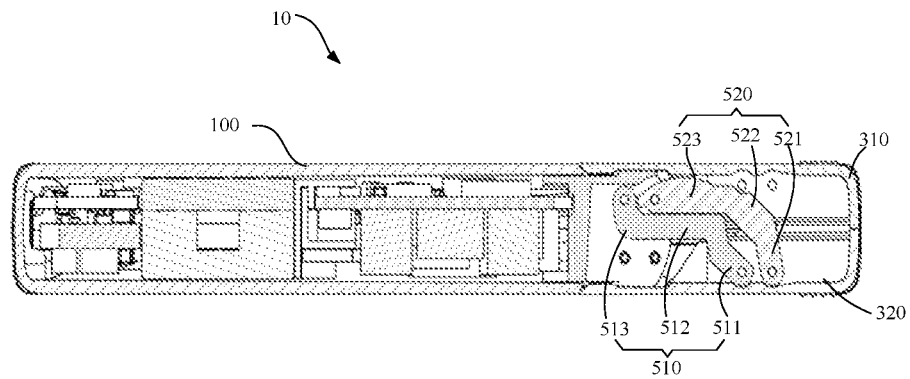
FIG. 15 is a schematic cross-sectional view of the power adapter illustrated in FIG. 2, taken along line II-II.
Figure 16:
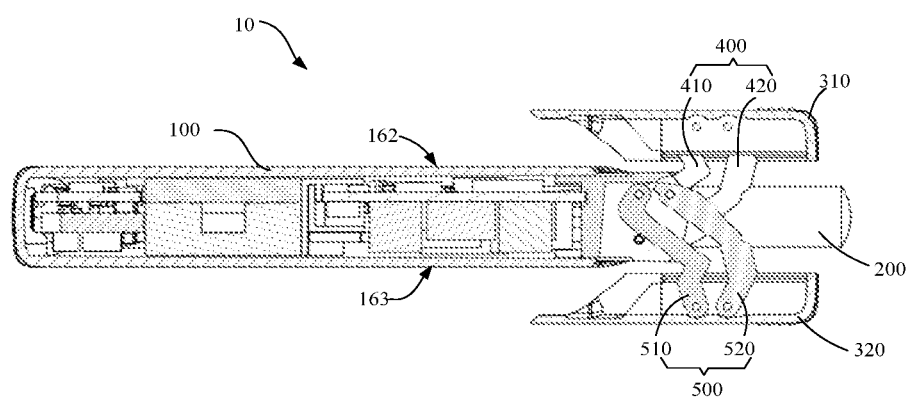
FIG. 16 is a cross-sectional view of the power adapter illustrated in FIG. 15 when in the semi-open state.
Figure 17:
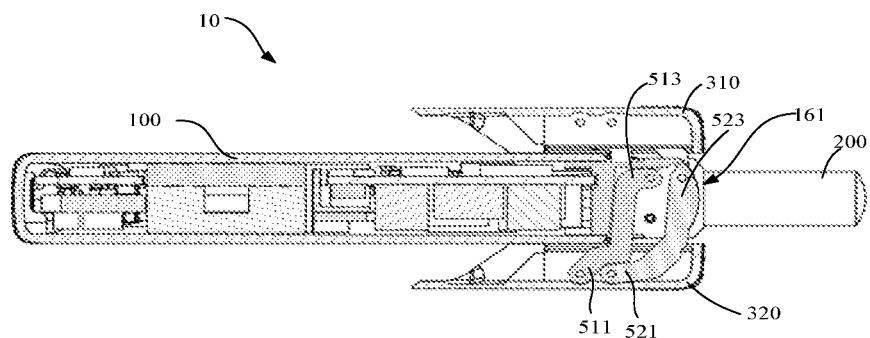
FIG. 17 is a cross-sectional view of the power adapter illustrated in FIG. 15 when in the open state.

Similarly, referring to FIG. 15 to FIG. 17, FIG. 15 is a schematic cross-sectional view of the power adapter illustrated in FIG. 2, taken along line II-II; FIG. 16 is a cross-sectional view of the power adapter illustrated in FIG. 15 in the semi-open state; and FIG. 17 is a cross-sectional view of the power adapter illustrated in FIG. 15 in the open state. In order for better illustration of the second sliding assembly 500, the first sliding assembly 400 is omitted in FIG. 15 and FIG. 17. The second sliding assembly 500 includes a third connecting member 510 and a fourth connecting member 520. The third connecting member 510 has one end rotatably connected with the second cover 320 and the other end rotatably connected with the adapter body 100. The fourth connecting member 520 has one end rotatably connected with the second cover 320 and the other end rotatably connected with the adapter body 100.

In the implementations, the second sliding assembly 500 has the same structure as the first sliding assembly 400. The third connecting member 510 has the same structure as the first connecting member 410, and the fourth connecting member 520 has the same structure as the second connecting member 420.

Specifically, the third connecting member 510 includes a fifth rotating portion 511, a third connecting portion 512, and a sixth rotating portion 513 that are sequentially connected. The fifth rotating portion 511 is rotatably connected with the second cover 320, and the sixth rotating portion 513 is rotatably connected with the adapter body 100. The fourth connecting member 520 includes a seventh rotating portion 521, a fourth connecting portion 522, and an eighth rotating portion 523 that are sequentially connected. The seventh rotating portion 521 is rotatably connected with the second cover 320, and the eighth rotating portion 523 is rotatably connected with the adapter body 100.

The manner in which the fifth rotating portion 511 is rotatably connected with the second cover 320 is elaborated as follows. In the implementations, the fifth rotating portion 511 defines a mounting hole (blind hole or through hole), and accordingly, the second cover 320 defines a mounting hole (blind hole or through hole). A rotation connecting member (such as a pin shaft) penetrates through the mounting hole of the fifth rotating portion 511 and the mounting hole of the second cover 320, such that the fifth rotating portion 511 is rotatably connected with the second cover 320. The fifth rotating portion 511 may also be rotatably connected with the second cover 320 in other manners. For example, the fifth rotating portion 511 is provided with a rotating member, and the second cover 320 defines a mounting hole, where the rotating member is disposed in the mounting hole and is rotatable in the mounting hole, such that the fifth rotating portion 511 is rotatably connected with the second cover 320. Alternatively, the fifth rotating portion 511 defines a mounting hole, and the second cover 320 is provided with a rotating member, where the rotating member is disposed in the mounting hole and is rotatable in the mounting hole, such that the fifth rotating portion 511 is rotatably connected with the second cover 320.

The manner in which the sixth rotating portion 513 is rotatably connected with the adapter body 100 is elaborated as follows. In the implementations, the sixth rotating portion 513 defines a mounting hole, and accordingly, the adapter body 100 defines a mounting hole. A rotation connecting member (such as a pin shaft) penetrates through the mounting hole of the sixth rotating portion 513 and the mounting hole of the adapter body 100, such that the sixth rotating portion 513 is rotatably connected with the adapter body 100. Similarly, the sixth rotating portion 513 may also be rotatably connected with the adapter body 100 in other manners. For example, the sixth rotating portion 513 is provided with a rotating member, and the adapter body 100 defines a mounting hole, where the rotating member is disposed in the mounting hole and is rotatable in the mounting hole, such that the sixth rotating portion 513 is rotatably connected with the adapter body 100. Alternatively, the sixth rotating portion 513 defines a mounting hole, and the adapter body 100 is provided with a rotating member, where the rotating member is disposed in the mounting hole and is rotatable in the mounting hole, such that the sixth rotating portion 513 is rotatably connected with the adapter body 100.

In addition, in the implementations, the adapter body 100 further has the first surface 162 and the second surface 163. The first surface 162 and the second surface 163 are each connected with the first end surface 161 and are disposed opposite to each other. The first surface 162 is disposed close to the first cover 310, and the second surface 163 is disposed close to the second cover 320. The seventh rotating portion 521 is rotatably connected with the second cover 320, and the eighth rotating portion 523 is rotatably connected with the adapter body 100. A connecting point between the sixth rotating portion 513 and the adapter body 100 and a connecting point between the eighth rotating portion 523 and the adapter body 100 are both away from the second surface 163.

When the first cover 310 and the second cover 320 are both in the closed state, the first surface 162 and the second surface 163 each constitute a part of an appearance surface of the power adapter 10. When the first cover 310 and the second cover 320 are both in the open state, at least a part of the first surface 162 is covered by the first cover 310, and at least a part of the second surface 163 is covered by the second cover 320.

In the implementations, the seventh rotating portion 521 is rotatably connected with the second cover 320 in the same manner as the fifth rotating portion 511 is rotatably connected with the second cover 320. In the implementations, the seventh rotating portion 521 defines a mounting hole, and accordingly, the second cover 320 defines a mounting hole. A rotation connecting member penetrates through the mounting hole of the seventh rotating portion 521 and the mounting hole of the second cover 320, such that the seventh rotating portion 521 is rotatably connected with the second cover 320. The seventh rotating portion 521 may also be rotatably connected with the second cover 320 in other manners. For example, the seventh rotating portion 521 is provided with a rotating member, and the second cover 320 defines a mounting hole, where the rotating member is disposed in the mounting hole and is rotatable in the mounting hole, such that the seventh rotating portion 521 is rotatably connected with the second cover 320. Alternatively, the seventh rotating portion 521 defines a mounting hole, and the second cover 320 is provided with a rotating member, where the rotating member is disposed in the mounting hole and is rotatable in the mounting hole, such that the seventh rotating portion 521 is rotatably connected with the second cover 320. It can be understood that, in other implementations, the manner in which the seventh rotating portion 521 is rotatably connected with the second cover 320 is different from the manner in which the fifth rotating portion 511 is rotatably connected with the second cover 320.

In the implementations, the eighth rotating portion 523 is rotatably connected with the adapter body 100 in the same manner as the sixth rotating portion 513 is rotatably connected with the adapter body 100. In the implementations, the eighth rotating portion 523 defines a mounting hole, and accordingly, the adapter body 100 defines a mounting hole. A rotation connecting member (such as a pin shaft) penetrates through the mounting hole of the eighth rotating portion 523 and the mounting hole of the adapter body 100, such that the eighth rotating portion 523 is rotatably connected with the adapter body 100. Similarly, the eighth rotating portion 523 may also be rotatably connected with the adapter body 100 in other manners. For example, the eighth rotating portion 523 is provided with a rotating member, and the adapter body 100 defines a mounting hole, where the rotating member is disposed in the mounting hole and is rotatable in the mounting hole, such that the eighth rotating portion 523 is rotatably connected with the adapter body 100. Alternatively, the eighth rotating portion 523 defines a mounting hole, and the adapter body 100 is provided with a rotating member, where the rotating member is disposed in the mounting hole and is rotatable in the mounting hole, such that the eighth rotating portion 523 is rotatably connected with the adapter body 100. It can be understood that, in other implementations, the manner in which the eighth rotating portion 523 is rotatably connected with the adapter body 100 is different from the manner in which the sixth rotating portion 513 is rotatably connected with the adapter body 100.

The connecting point between the sixth rotating portion 513 and the adapter body 100 and the connecting point between the eighth rotating portion 523 and the adapter body 100 are both away from the second surface 163, which is possible to reduce a space size of the adapter body 100 in terms of thickness, such that the power adapter 10 can be small in thickness.

In schematic views of the implementations, the second sliding assembly 500 exemplarily includes the third connecting member 510 and the fourth connecting member 520. It can be understood that, in other implementations, the second sliding assembly 500 includes the third connecting member 510 rather than the fourth connecting member 520. If the second sliding assembly 500 includes not only the third connecting member 510 but also the fourth connecting member 520, the second cover 320 can be connected with the adapter body 100 stably, such that the second cover 320 can move relative to the adapter body 100 steadily and is not prone to shaking, and does not tend to skew and swing.

Figure 18:
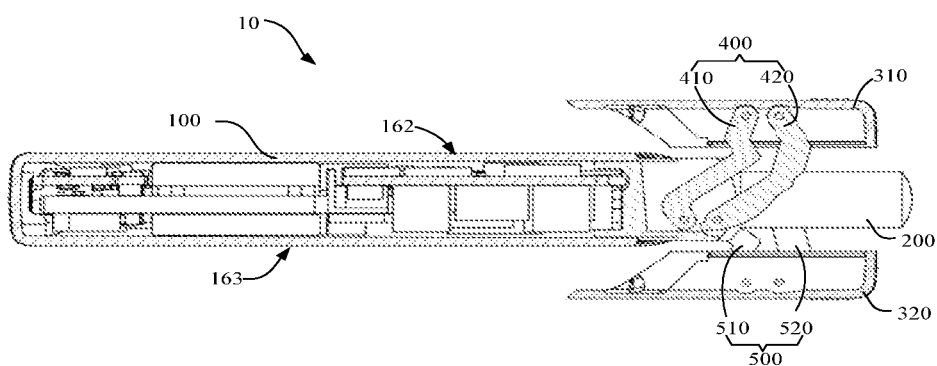
FIG. 18 is a cross-sectional view of the power adapter when in the semi-open state, viewed from another direction.

The connecting point between the second rotating portion 413 and the adapter body 100 and the connecting point between the fourth rotating portion 423 and the adapter body 100 are both away from the first surface 162. The connecting point between the sixth rotating portion 513 and the adapter body 100 and the connecting point between the eighth rotating portion 523 and the adapter body 100 are both away from the second surface 163. As such, the first sliding assembly 400 and the second sliding assembly 500 are staggered from each other (refer to FIG. 17 and FIG. 18), which is possible to save space of the power adapter 10 and thus is beneficial to miniaturization of the power adapter 10.

Exemplarily, in the implementations, the fifth rotating portion 511 of the third connecting member 510 is fixed at the second cover 320 through a pin shaft, and the sixth rotating portion 513 of the third connecting member 510 is fixed at the adapter body 100 through a pin shaft. The seventh rotating portion 521 of the fourth connecting member 520 is fixed at the second cover 320 through a pin shaft, and the eighth rotating portion 523 is fixed at the adapter body 100 through a pin shaft. In the implementations, the adapter body 100, the third connecting member 510, the fourth connecting member 520, and the second cover constitute another four-bar mechanism, where the adapter body 100 functions as a frame of the four-bar mechanism, the third connecting member 510 and the fourth connecting member 520 function as connecting rods of the four-bar mechanism, and the second cover 320 functions as a linkage assembly of the four-bar mechanism.

Figure 19:
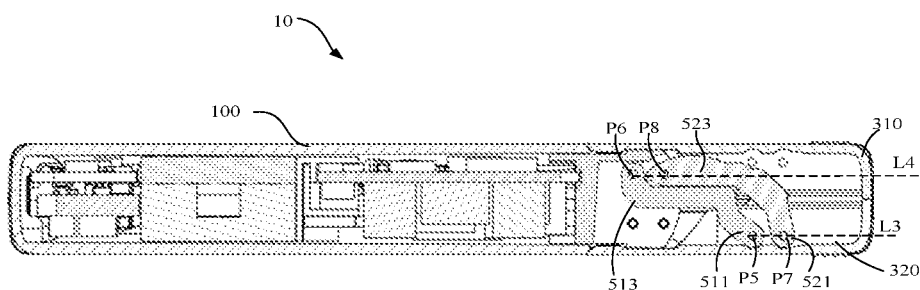
FIG. 19 is a schematic view illustrating connecting points in the power adapter illustrated in FIG. 15.
Figure 20:
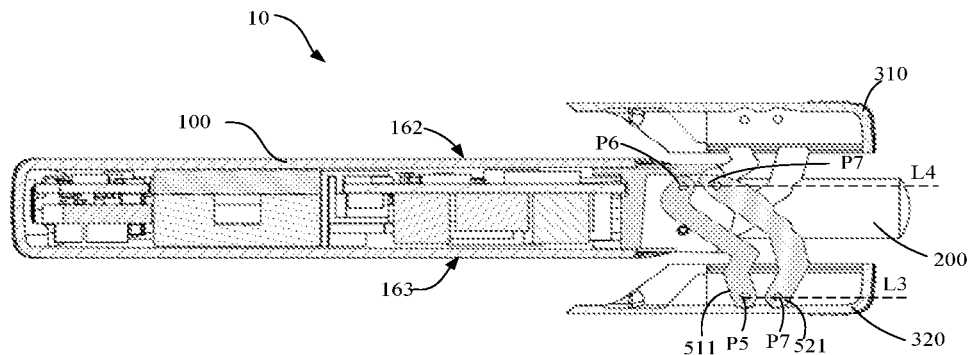
FIG. 20 is a schematic view illustrating connecting points in the power adapter illustrated in FIG. 16.
Figure 21:
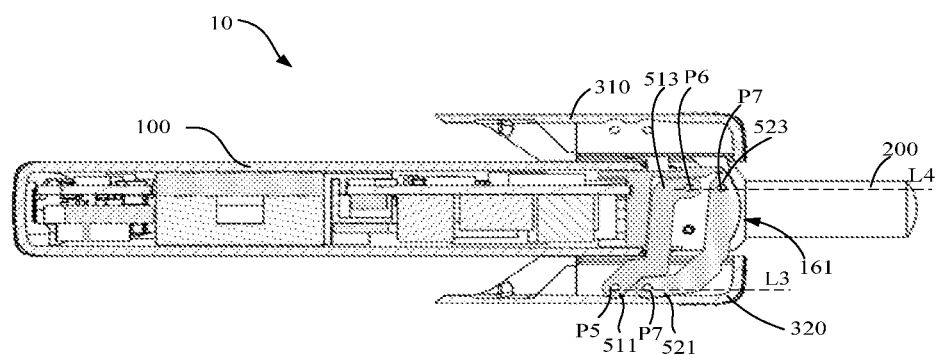
FIG. 21 is a schematic view illustrating connecting points in the power adapter illustrated in FIG. 17.

Referring to FIG. 19 to FIG. 21, FIG. 19 is a schematic view illustrating connecting points in the power adapter illustrated in FIG. 15, FIG. 20 is a schematic view illustrating connecting points in the power adapter illustrated in FIG. 16, and FIG. 21 is a schematic view illustrating connecting points in the power adapter illustrated in FIG. 17. A center of a rotatable connecting member connecting the fifth rotating portion 511 and the second cover 320 is a fifth connecting point P5, a center of a rotatable connecting member connecting the sixth rotating portion 513 and the adapter body 100 is a sixth connecting point P6, a center of a rotatable connecting member connecting the seventh rotating portion 521 and the second cover 320 is a seventh connecting point P7, and a center of a rotatable connecting member connecting the eighth rotating portion 523 and the adapter body 100 is an eighth connecting point P8. A line 3 between the fifth connecting point P5 and the seventh connecting point P7 is parallel to a line L4 between the sixth connecting point P6 and the eighth connecting point P8. As such, the four-bar mechanism constituted by the second cover 320, the third connecting member 510, the fourth connecting member 520, and the adapter body 100 can remain in parallel motion during sliding of the second cover 320 relative to the adapter body 100. The second cover 320 can move relative to the adapter body 100 steadily and is not prone to shaking, and does not tend to skew and swing.

In addition, with aid of the first magnetic member 600 and the second magnetic member 700, the second cover 320 moves following movement of the first cover 310, or the first cover 310 moves following movement of the second cover 320. Since a four-bar mechanism (first four-bar mechanism) constituted by the first cover 310, the first connecting member 410, the second connecting member 420, and the adapter body 100 remains in parallel motion during movement, and a four-bar mechanism (second four-bar mechanism) constituted by the second cover 320, the third connecting member 510, the fourth connecting member 520, and the adapter body 100 remains in parallel motion during movement, the first four-bar mechanism and the second four-bar mechanism will remain in parallel motion during movement of the first linkage assembly and the second linkage assembly.

In addition, the connecting point between the second rotating portion 413 and the adapter body 100 and the connecting point between the fourth rotating portion 423 and the adapter body 100 are both away from the first surface 162. The connecting point between the sixth rotating portion 513 and the adapter body 100 and the connecting point between the eighth rotating portion 523 and the adapter body 100 are both away from the second surface 163. As such, the first sliding assembly 400 and the second sliding assembly 500 are staggered from each other, which is possible to save space of the power adapter 10 and thus is beneficial to miniaturization of the power adapter 10.

Specifically, the adapter body 100 functions as a frame of the first four-bar mechanism and the second four-bar mechanism. In other words, a line between a center of a rotatable connecting member connecting the second rotating portion 413 and the adapter body 100 and a center of a rotatable connecting member connecting the fourth rotating portion 423 and the adapter body 100 locate in the lower portion of the adapter body 100, where the lower portion of the adapter body 100 functions as a frame (first frame). When the first cover 310 slides, the first cover 310 moves along the first frame.

Similarly, a line between the center of the rotatable connecting member connecting the sixth rotating portion 513 and the adapter body 100 and the center of the rotatable connecting member connecting the eighth rotating portion 523 and the adapter body 100 locate in the upper portion of the adapter body 100, where the upper portion of the adapter body 100 functions as a frame (second frame). When the second cover 320 slides, the second cover 320 moves along the second frame.

As can be seen, the first sliding assembly 400 and the second sliding assembly 500 are staggered from each other, thereby forming a staggered structure of "the upper controls the lower, and the lower controls the upper", in which the first frame disposed below controls the first cover 310 disposed above and the second frame disposed above controls the second cover 320 disposed below.

Figure 22:
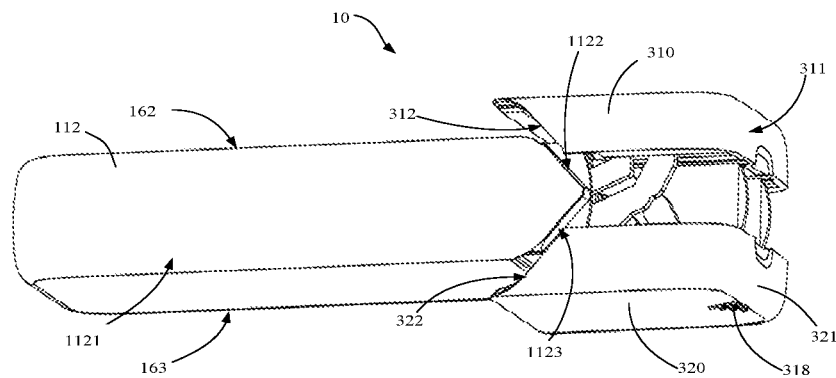
FIG. 22 is a schematic structural view of the power adapter illustrated in FIG. 2 when in the semi-open state.

Referring to FIG. 22, FIG. 22 is a schematic structural view of the power adapter illustrated in FIG. 2 in the semi-open state. The first cover 310 further has a first fitting surface 312 away from the first end subsurface 311, and the second cover 320 further has a second fitting surface 322 away from the second end subsurface 321. Accordingly, the adapter body 100 further has a sidewall 112 connected between the first surface 162 and the second surface 163. The sidewall 112 has a side surface 1121, where the side surface 1121 connects the first surface 162 and the second surface 163. The sidewall 112 has a first connecting surface 1122 and a second connecting surface 1123 that are connected in a bent manner. The first connecting surface 1122 and the second connecting surface 1123 are each connected with the side surface 1121 and are close to the prong 200. When the first cover 310 is in the closed state, the first fitting surface 312 faces the first connecting surface 1122. When the second cover 320 is in the closed state, the second fitting surface 322 faces the second connecting surface 1123.

A joint between the first connecting surface 1122 and the second connecting surface 1123 is an arc surface. The first connecting surface 1122 and the second connecting surface 1123 are each an inclined surface, and accordingly, the first fitting surface 312 and the second fitting surface 322 are each an inclined surface. As such, the adapter body 100 does not hinder movement of the first cover 310 and the second cover 320 when the first cover 310 and the second cover 320 slide relative to the adapter body 100, that is, the first connecting surface 1122 provides an avoidance space for the first fitting surface 312 and the second connecting surface 1123 provides an avoidance space for the second fitting surface 322, such that the first cover 310 and the second cover 320 can slide more smoothly.

Referring to FIG. 22, the first cover 310 and the second cover 320 are each further provided with an operating portion 318. The operating portions 318 are convenient for a user to operate the first cover 310 and the second cover 320. In the implementations, the operating portion 318 is implemented as a protruding structure. In other implementations, the operating portion 318 may be implemented as multiple grooves defined at the first cover 310 and the second cover 320 or rough structures at the first cover 310 and the second cover 320. It can be understood that, in other implementations, the first cover 310 is provided with the operating portion 318, or the second cover 320 is provided with the operating portion 318.

It can be understood that, in other implementations, neither the first cover 310 nor the second cover 320 is provided with the operating portion 318. If the power adapter 10 needs to be used, what is needed is to apply a pushing force to any one of the first end subsurface 311 of the first cover 310 and the second end subsurface 321 of the second cover 320.

Figure 23:
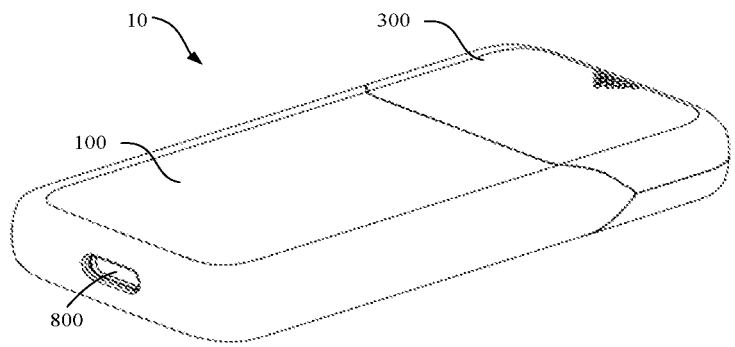
FIG. 23 is a schematic view of the power adapter in FIG. 2 according to the disclosure, viewed from another direction.

Referring to FIG. 23, FIG. 23 is a schematic view of the power adapter in FIG. 2 according to the disclosure, viewed from another direction. The power adapter 10 further includes a discharging interface 800. The discharging interface 800 is electrically connected with a circuit board 120 (refer to FIG. 24), and is configured to output the second voltage that is obtained through conversion by the circuit board 120. The discharging interface 800 may be, but is not limited to, a universal serial bus (USB) interface. If the discharging interface 800 is a USB interface, the USB interface may be, but is not limited to, a USB 2.0 interface or a USB 3.0 interface, etc.

Figure 24:
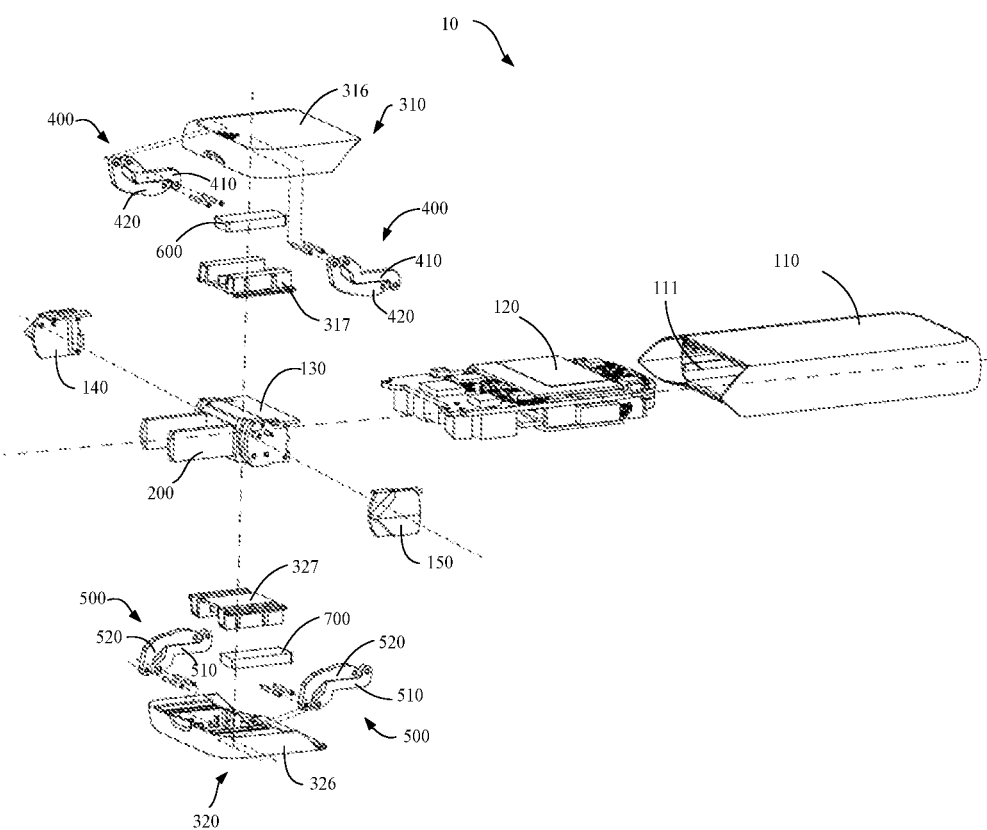
FIG. 24 is a schematic exploded view of the power adapter illustrated in FIG. 2.

The following will introduce a method for assembling the power adapter 10 provided in an implementation of the disclosure in conjunction with the power adapter 10 elaborated above and an exploded view of the power adapter 10. Referring to FIG. 24, FIG. 24 is a schematic exploded view of the power adapter illustrated in FIG. 2. Exemplarily, in the implementations, the first sliding assembly 400 is implemented as two first sliding assemblies, the second sliding assembly 500 is implemented as two second sliding assemblies, and the rotatable connecting members are each a pin shaft. In the implementations, the adapter body 100 includes a casing 110, a circuit board 120, a carrier base 130, a first end-cap 140, and a second end-cap 150. The casing 110 defines an accommodating space 111 for accommodating the circuit board 120. The carrier base 130 is used for carrying the prongs 200, and is disposed at an opening of the accommodating space 111. The first end-cap 140 is disposed at one of two opposite sides of the carrier base 130, the second end-cap 150 is disposed at the other one of the two opposite sides of the carrier base 130, and the first end-cap 140 and the second end-cap 150 cooperate with the casing 110 to install the carrier base 130. Surfaces of the first end-cap 140 away from the casing 110 are respectively the first connecting surface 1122 and the second connecting surface 1123 described above, and accordingly, surfaces of the second end-cap 150 away from the casing 110 are respectively the first connecting surface 1122 and the second connecting surface 1123 described above. It can be understood that, the adapter body 100 described above has two opposite sidewalls 112, where one of the two opposite sidewalls 112 includes the first end-cap 140 and a part of the casing 110 connected with the first end-cap 140, and the other one of the two opposite sidewalls 112 includes the second end-cap 150 and a part of the casing 110 connected with the second end-cap 150.

The first cover 310 includes a first cover-body portion 316 and a first capping portion 317. A surface of the first cover-body portion 316 constitutes a part of an appearance surface of the power adapter 10. The first cover-body portion 316 is used for accommodating the first magnetic member 600. The first capping portion 317 cooperates with the first cover-body portion 316 to install the first magnetic member 600. The second cover 320 includes a second cover-body portion 326 and a second capping portion 327. A surface of the second cover-body portion 326 constitutes a part of an appearance surface of the power adapter 10. The second cover-body portion 326 is used for accommodating the second magnetic member 700. The second capping portion 327 cooperates with the second cover-body portion 326 to install the second magnetic member 700. When the first cover 310 and the second cover 320 are both in the closed state, the first capping portion 317 faces the second capping portion 327, the first cover-body portion 316 is farther away from the second cover 320 than the first capping portion 317, and the second cover-body portion 326 is farther away from the first cover 310 than the second capping portion 327.

The first magnetic member 600 and the first capping portion 317 are installed at the first cover-body portion 316. The second magnetic member 700 and the second capping portion 327 are installed at the second cover-body portion 326.

For one of the two first sliding assemblies 400, the first connecting member 410 is installed at the first cover 310 through a rotatable connecting member (pin shaft), and the second connecting member 420 is installed at the first cover 310 through a rotatable connecting member (pin shaft).

For the other one of the two first sliding assemblies 400, the first connecting member 410 is installed at the first cover 310 through a rotatable connecting member (pin shaft), and the second connecting member 420 is installed at the first cover 310 through a rotatable connecting member (pin shaft).

For the one of the two first sliding assemblies 400, the first connecting member 410 (connecting rod) is further installed at the carrier base 130 through a rotatable connecting member (pin shaft), and the second connecting member 420 (connecting rod) is further installed at the carrier base 130 through a rotatable connecting member (pin shaft).

For the other one of the two first sliding assemblies 400, the first connecting member 410 is further installed at the carrier base 130 through a rotatable connecting member (pin shaft), and the second connecting member 420 is further installed at the carrier base 130 through a rotatable connecting member (pin shaft).

For one of the two second sliding assemblies 500, the third connecting member 510 is installed at the second cover 320 through a rotatable connecting member (pin shaft), and the fourth connecting member 520 is installed at the second cover 320 through a rotatable connecting member (pin shaft).

For the other one of the two second sliding assemblies 500, the third connecting member 510 is installed at the second cover 320 through a rotatable connecting member (pin shaft), and the fourth connecting member 520 is installed at the second cover 320 through a rotatable connecting member.

For the one of the two second sliding assemblies 500, the third connecting member 510 is installed at the carrier base 130 through a rotatable connecting member (pin shaft), and the fourth connecting member 520 is installed at the carrier base 130 through a rotatable connecting member (pin shaft).

For the other one of the two second sliding assemblies 500, the third connecting member 510 is installed at the carrier base 130 through a rotatable connecting member, and the fourth connecting member 520 is installed at the carrier base 130 through a rotatable connecting member (pin shaft).

The first end-cap 140 is installed at the carrier base 130, the second end-cap 150 is installed at the carrier base 130, and the carrier base 130 and the circuit board 120 are installed at the casing 110.

Figure 25:
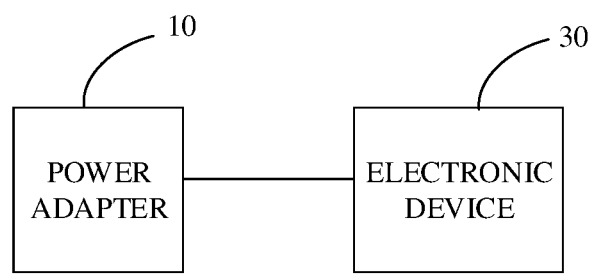
FIG. 25 is a schematic diagram of an electronic device assembly provided in an implementation of the disclosure.

The disclosure further provides an electronic device assembly. Referring to FIG. 25, FIG. 25 is a schematic diagram of an electronic device assembly provided in an implementation of the disclosure. The electronic device assembly 1 includes an electronic device 30 and the power adapter 10. The power adapter 10 is configured to charge the electronic device 30. The electronic device 30 may be a device to-be-charged such as a mobile phone, a computer, etc. The electronic device 30 includes a battery. The power adapter 10 is configured to receive a first voltage and convert the first voltage into the second voltage, where the second voltage is to be applied to the battery for charging. For details of the power adapter 10, reference can be made to the foregoing elaborations, which will not be repeated herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A power adapter, comprising:
   an adapter body having a first end surface;
   prongs exposed at the first end surface of the adapter body; and
   a cover movably connected with the adapter body and having a second end surface, wherein:
     when the cover is in a closed state, the prongs are covered, and the second end surface is away from the adapter body; and
     when the cover is in an open state, the first end surface and the second end surface cooperatively form a plugging surface of the power adapter;
   wherein the cover comprises:
     a first cover connected with and slidable relative to the adapter body and having a first end subsurface; and
     a second cover connected with and slidable relative to the adapter body and having a second end subsurface,
     wherein the second end surface comprises the first end subsurface and the second end subsurface; when the first cover and the second cover are in the closed state, the first end subsurface and the second end subsurface are away from the adapter body; and when the first cover and the second cover are both in the open state, the first end subsurface is disposed at a first one of two opposite sides of the first end surface, the second end subsurface is disposed at a second one of the two opposite sides of the first end surface, and the first end subsurface, the second end subsurface, and the first end surface cooperatively form the plugging surface of the power adapter;

wherein the power adapter further comprises:

a first sliding assembly having a first end rotatably connected with the first cover and a second end rotatably connected with the adapter body, such that the first cover is slidable relative to the adapter body; and a second sliding assembly having a first end rotatably connected with the second cover and a second end rotatably connected with the adapter body, such that the second cover is slidable relative to the adapter body;

wherein the first sliding assembly is implemented as two first sliding assemblies, and the two first sliding assemblies are spaced apart from each other; and when the first cover is in the closed state, the prongs are between the two first sliding assemblies.

2. The power adapter of claim 1, wherein the first sliding assembly comprises:

a first connecting member having a first rotating portion, a first connecting portion, and a second rotating portion that are sequentially connected, wherein the first rotating portion is rotatably connected with the first cover, and the second rotating portion is rotatably connected with the adapter body.

3. The power adapter of claim 2, wherein the adapter body further has a first surface and a second surface, wherein the first surface and the second surface are each connected with the first end surface and are disposed opposite to each other, the first surface is disposed close to the first cover, and the second surface is disposed close to the second cover; and the first sliding assembly further comprises:

a second connecting member having a third rotating portion, a second connecting portion, and a fourth rotating portion that are sequentially connected, wherein the third rotating portion is rotatably connected with the first cover, the fourth rotating portion is rotatably connected with the adapter body, and a connecting point between the second rotating portion and the adapter body and a connecting point between the fourth rotating portion and the adapter body are both away from the first surface.

4. The power adapter of claim 3, wherein a point at which the first rotating portion is rotatably connected with the first cover is a first connecting point, the connecting point between the second rotating portion and the adapter body is a second connecting point, a point at which the third rotating portion is rotatably connected with the first cover is a third connecting point, and when the first cover is in the closed state, the third connecting point is farther away from the first end surface than the first connecting point; the connecting point between the fourth rotating portion and the adapter body is a fourth connecting point, the fourth connecting point is closer to the first end surface than the second connecting point, and a line between the first connecting point and the third connecting point is parallel to a line between the second connecting point and the fourth connecting point.

5. The power adapter of claim 4, wherein a distance between the first connecting point and the second connecting point is equal to a distance between the third connecting point and the fourth connecting point.

6. The power adapter of claim 3, wherein the third rotating portion, the second connecting portion, and the fourth rotating portion are sequentially connected in a bent manner, to define an avoidance space that faces the first connecting member, the avoidance space is used for avoiding interference between the first connecting member and the second connecting member during rotation of the first connecting member and the second connecting member; when the first cover is in the closed state, the first connecting portion abuts against the fourth rotating portion; and when the first cover is in the open state, the first rotating portion abuts against the third rotating portion.

7. The power adapter of claim 3, wherein the second cover has a third surface and a fourth surface, the third surface and the fourth surface are each connected with the second end subsurface, the third surface constitutes a part of an appearance surface of the power adapter, the fourth surface is disposed opposite to the third surface, and the fourth surface defines a limiting portion for preventing shaking of the second sliding assembly.

8. The power adapter of claim 7, wherein the fourth surface further defines a first accommodating portion and a second accommodating portion; and when the first cover and the second cover are in the closed state, the first accommodating portion accommodates at least a part of the first connecting member and at least a part of the second connecting member, and the second accommodating portion accommodates the prong.

9. The power adapter of claim 1, wherein the second sliding assembly is implemented as two sliding assemblies, and the two second sliding assemblies are spaced apart from each other; and when the second cover is in the closed state, the prongs are disposed between the two second sliding assemblies, and for the first sliding assembly and the second sliding assembly that are at a same side of the prong, the second sliding assembly is farther away from the prong than the first sliding assembly.

10. The power adapter of claim 1, further comprising:

a first magnetic member carried on the first cover; and a second magnetic member carried on the second cover, wherein when the first cover and the second cover are both in the closed state, a magnetic force between the first magnetic member and the second magnetic member makes the first cover and the second cover be fixed at a same side of the first end surface; and when the first cover and the second cover are both in the open state, the magnetic force between the first magnetic member and the second magnetic member makes the first cover and the second cover each be fixed on the adapter body.

11. The power adapter of claim 1, wherein when the cover is in the open state, a distance between an edge of the prong close to the cover and an edge of the cover away from the prong is larger than or equal to 5.1 millimeters (mm).

12. The power adapter of claim 11, wherein when the first cover and the second cover are both in the open state, the first cover is disposed at one of two opposite sides of the adapter body, and the second cover is disposed at the other one of the two opposite sides of the adapter body; and a thickness D1 of the adapter body fulfills 6.3 mm≤D1≤14 mm, a thickness D2 of the first cover fulfills 4.825 mm≤D2≤7 mm, and a thickness D3 of the second cover fulfills 4.825 mm≤D3≤7 mm.

13. A power adapter, comprising an adapter body, prongs, a first cover, and a second cover, the adapter body having a first end surface where the prongs are exposed, the first cover and the second cover each being slidably connected with the adapter body, the first cover having a first end subsurface, and the second cover having a second end subsurface, wherein at least one of the first cover or the second cover has an accommodating cavity, and when the first cover and the second cover are both in a closed state, the prongs are accommodated in the accommodating cavity, and the first end subsurface and the second end subsurface are both away from the first end surface; and when the first cover and the second cover are both in an open state, the first cover is disposed at a first one of two opposite sides of the adapter body and the second cover is disposed at a second one of the two opposite sides of the adapter body to expose the prongs, and the first end surface, the first end subsurface, and the second end subsurface cooperatively form a plugging surface of the power adapter;

wherein the adapter body has a first surface and a second surface that are disposed opposite to each other, the first surface and the second surface are each connected with the first end surface, the second cover is closer to the second surface than the first cover, the second cover has a third surface and a fourth surface that are disposed opposite to each other, and the third surface and the fourth surface are each connected with the second end subsurface; when the second cover is in the closed state, the third surface constitutes a part of an appearance surface of the power adapter; and when the second cover is in the open state, the third surface is farther away from the second surface than the fourth surface.

14. The power adapter of claim 13, wherein the first cover has a fifth surface and a sixth surface that are disposed opposite to each other, and the fifth surface and the sixth surface are each connected with the first end subsurface; when the first cover is in the closed state, the fifth surface constitutes a part of the appearance surface of the power adapter; and when the first cover is in the open state, the fifth surface is farther away from the first surface than the sixth surface.

15. The power adapter of claim 14, further comprising a first sliding assembly and a second sliding assembly, wherein the first sliding assembly has one end rotatably connected with the first cover and the other end rotatably connected with the adapter body, and a connecting point at which the first sliding assembly is connected with the adapter body is close to the second surface; and the second sliding assembly has one end rotatably connected with the second cover and the other end rotatably connected with the adapter body, and a connecting point at which the second sliding assembly is connected with the adapter body is close to the first surface.

16. The power adapter of claim 13, further comprising:
a first magnetic member carried on the first cover; and
a second magnetic member carried on the second cover, wherein when the first cover and the second cover are both in the closed state, a magnetic force between the first magnetic member and the second magnetic member makes the first cover and the second cover be fixed at a same side of the first end surface; and when the first cover and the second cover are both in the open state, the magnetic force between the first magnetic member and the second magnetic member makes the first cover and the second cover each be fixed on the adapter body.

* * * * *